(12) United States Patent
Matyas

(10) Patent No.: US 12,535,871 B1
(45) Date of Patent: Jan. 27, 2026

(54) DUAL MODE WANDER MANAGEMENT AND ELOPEMENT PREVENTION SYSTEM

(71) Applicant: David Srul Matyas, Lakewood, NJ (US)

(72) Inventor: David Srul Matyas, Lakewood, NJ (US)

(*) Notice: Subject to any disclaimer, the term of this patent is extended or adjusted under 35 U.S.C. 154(b) by 0 days.

(21) Appl. No.: 19/208,521

(22) Filed: May 14, 2025

Related U.S. Application Data

(60) Provisional application No. 63/647,224, filed on May 14, 2024.

(51) Int. Cl.

| | |
|---|---|
| *G06F 1/32* | (2019.01) |
| *G01S 5/02* | (2010.01) |
| *G01S 13/02* | (2006.01) |
| *G06F 1/26* | (2006.01) |
| *G06F 1/3231* | (2019.01) |
| *H04W 4/029* | (2018.01) |
| *H04W 4/80* | (2018.01) |

(52) U.S. Cl.
CPC .......... *G06F 1/3231* (2013.01); *G01S 5/0231* (2013.01); *G01S 13/0209* (2013.01); *G06F 1/263* (2013.01); *H04W 4/029* (2018.02); *H04W 4/80* (2018.02)

(58) Field of Classification Search
CPC ...... G06F 1/3231; G06F 1/263; H04W 4/029; H04W 4/80; G01S 5/0231; G01S 13/0209
See application file for complete search history.

(56) References Cited

U.S. PATENT DOCUMENTS

| | | | |
|---|---|---|---|
| 4,682,155 | A | 7/1987 | Shirley |
| 7,365,645 | B2 | 4/2008 | Heinze et al. |
| 7,916,023 | B2 | 3/2011 | Rado |
| | | (Continued) | |

FOREIGN PATENT DOCUMENTS

| | | |
|---|---|---|
| CN | 212994913 U | 4/2021 |
| CN | 114493657 A | 5/2022 |
| | (Continued) | |

OTHER PUBLICATIONS

Securitas Healthcare, "WanderGuard Blue Overview," Feb. 2023.
(Continued)

*Primary Examiner* — Zahid Choudhury
(74) *Attorney, Agent, or Firm* — Shlomo S. Moshen; David W. Barman

(57) ABSTRACT

A system, device, and method are provided for tracking the location of a wearable device. The wearable device includes an ultra-wideband (UWB) module for micro tracking via interactions with fixed-location or mobile UWB anchors, and a short-range communication module for transmitting location data to a backend location server, either through a gateway or over a network. The system may also include an escort device, which operates as a mobile anchor and is capable of pairing with the wearable device for indoor and outdoor micro tracking. In one embodiment, the wearable device further includes a satellite-positioning module for macro tracking and a long-range communication module for transmitting location data to the backend location server. A second battery may be provided as a backup power source or as a primary power source for the macro-tracking features.

20 Claims, 27 Drawing Sheets

(56) References Cited

U.S. PATENT DOCUMENTS

| | | | |
|---|---|---|---|
| 8,195,192 B2 | 6/2012 | Chow et al. | |
| 8,937,554 B2 | 1/2015 | Kwan et al. | |
| 9,922,537 B2 | 3/2018 | Shah et al. | |
| 10,168,430 B2 | 1/2019 | Sobol | |
| 10,453,327 B2 | 10/2019 | Messier et al. | |
| 10,729,211 B2 | 8/2020 | Sobol et al. | |
| 10,905,105 B2 | 2/2021 | Crouthamel et al. | |
| 10,930,133 B1* | 2/2021 | Chen | G01S 11/06 |
| 11,026,067 B2* | 6/2021 | Martin | G01S 1/0428 |
| 11,062,583 B1 | 7/2021 | Sathaye et al. | |
| 11,410,765 B2 | 8/2022 | Ahmed et al. | |
| 11,675,878 B1* | 6/2023 | Pandya | G01S 17/86 |
| | | | 382/103 |
| 2007/0159332 A1 | 7/2007 | Koblasz | |
| 2010/0267361 A1 | 10/2010 | Sullivan | |
| 2012/0007735 A1 | 1/2012 | Rhyins | |
| 2012/0322380 A1 | 12/2012 | Nannarone et al. | |
| 2013/0009777 A1 | 1/2013 | Aarts et al. | |
| 2013/0260785 A1 | 10/2013 | Shakespeare et al. | |
| 2015/0048942 A1 | 2/2015 | Bertagna et al. | |
| 2015/0221194 A1 | 8/2015 | Sarkar | |
| 2016/0021506 A1 | 1/2016 | Bonge, Jr. | |
| 2016/0165853 A1 | 6/2016 | Goldfain | |
| 2018/0224517 A1* | 8/2018 | Ingerson | G01S 19/14 |
| 2019/0142305 A1 | 5/2019 | Tan et al. | |
| 2019/0209022 A1* | 7/2019 | Sobol | A61B 5/681 |
| 2019/0239060 A1* | 8/2019 | Yoon | G06F 1/163 |
| 2020/0092681 A1 | 3/2020 | Shapiro et al. | |
| 2020/0372781 A1 | 11/2020 | Foster et al. | |
| 2021/0196153 A1 | 7/2021 | Ten Kate et al. | |
| 2021/0319894 A1 | 10/2021 | Sobol et al. | |
| 2022/0141619 A1 | 5/2022 | Parikh et al. | |
| 2022/0160298 A1 | 5/2022 | Panneer Selvam et al. | |
| 2022/0230746 A1 | 7/2022 | Anthapur | |
| 2023/0308827 A1* | 9/2023 | Shin | H04S 7/303 |
| 2023/0384828 A1* | 11/2023 | Edwards | G16H 10/65 |
| 2024/0005922 A1* | 1/2024 | Xu | H04L 67/52 |
| 2024/0129726 A1* | 4/2024 | Russell | H04W 12/08 |

FOREIGN PATENT DOCUMENTS

| | | |
|---|---|---|
| CN | 115205892 A | 10/2022 |
| CN | 116385965 A | 7/2023 |
| IN | 202241047519 A | 8/2022 |
| NO | 20211199 A1 | 4/2023 |
| WO | 2023076950 A1 | 5/2023 |

OTHER PUBLICATIONS

Senior Technologies, "Draft Operating Instructions for the 90-Day Signaling Device, Model 32013," Apr. 4, 2000.

Lois A. Bowers, "Stanley announces updated wander management technology," McKnight's Senior Living, Nov. 17, 2016.

Accutech, "ResidentGuard Brochure," May 2018.

CenTrak, "Wander Management Brochure," Mar. 3, 2020.

* cited by examiner

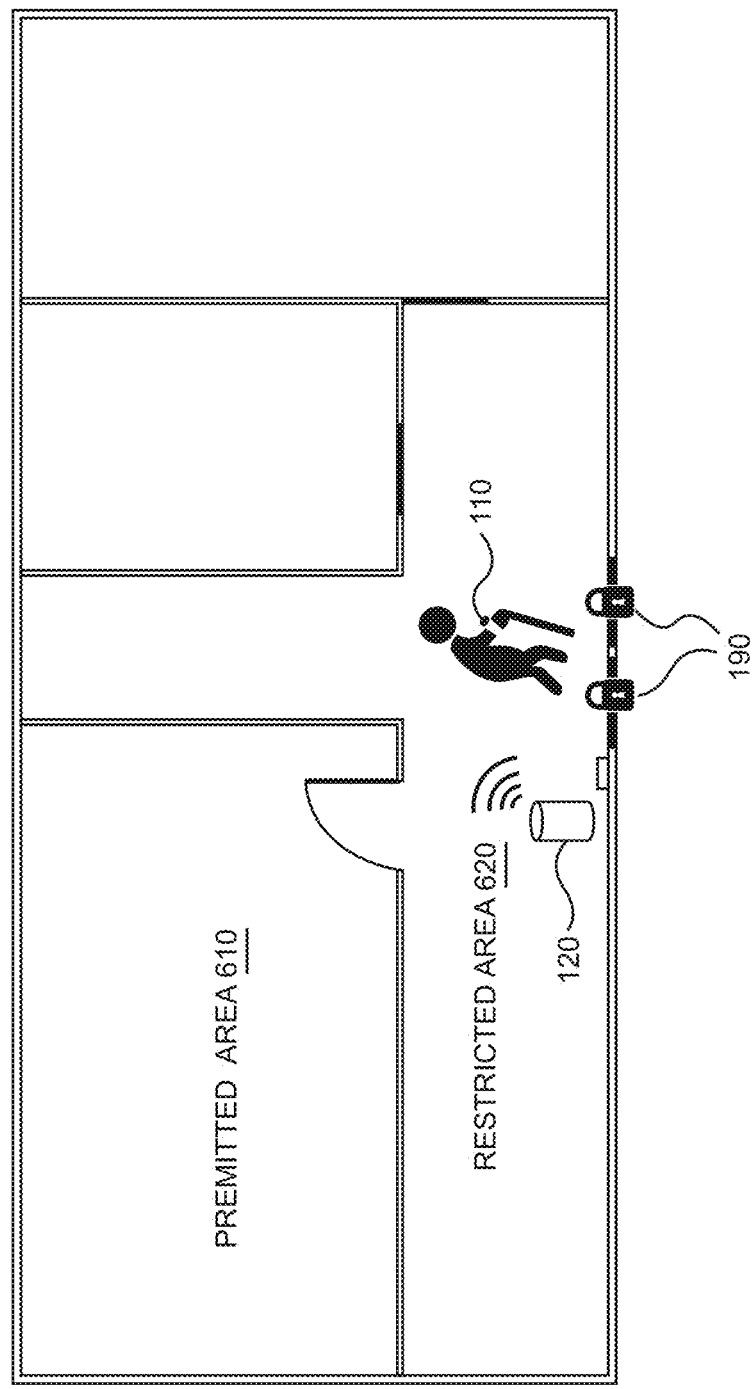

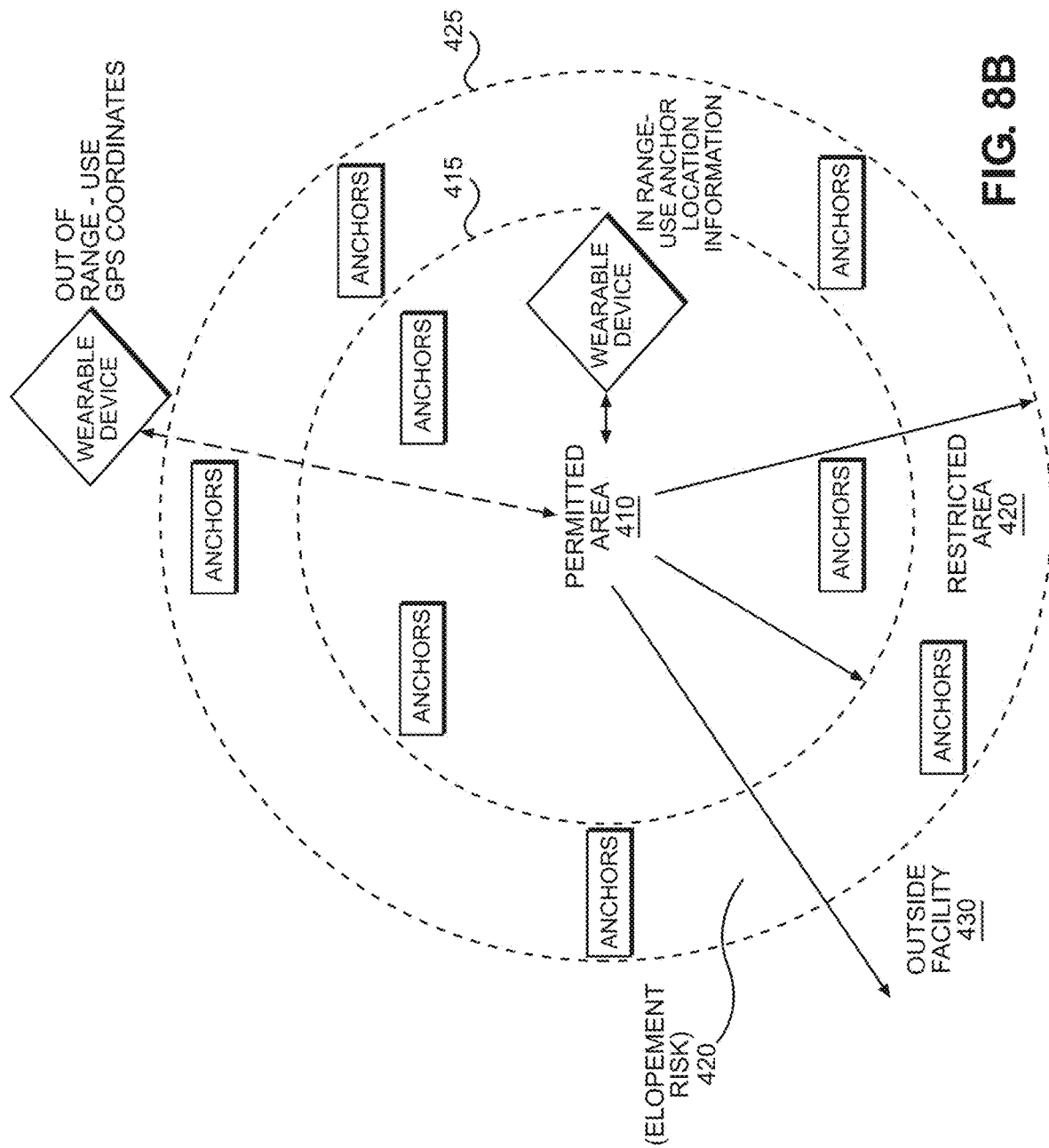

| DEVICE | COMMUNICATION PROTOCOL | FUNCTION/PURPOSE |
|---|---|---|
| WEARABLE DEVICE | UWB | TRACKING |
| WEARABLE DEVICE | CELLULAR | COMMUNICATION WITH LOCATION SERVER |
| ANCHORS | UWB | LOCATION DETECTION |
| ANCHORS | ETHERNET / WIFI | COMMUNICATION WITH LOCATION SERVER |
| LOCATION SERVER | ETHERNET / WIFI | PROCESSING |
| ESCORT DEVICE | UWB | LOCATION DETECTION |
| ESCORT DEVICE | WIFI | COMMUNICATION WITH GATEWAY |
| ESCORT DEVICE | CELLULAR | COMMUNICATION WITH LOCATION SERVER |
| ADMIN TERMINAL | ETHERNET / WIFI | SYSTEM MANAGEMENT |

FIG. 10

DUAL MODE WANDER MANAGEMENT AND ELOPEMENT PREVENTION SYSTEM

CROSS-REFERENCE TO RELATED APPLICATIONS

The present application claims benefit of priority to U.S. Provisional Patent Application No. 63/647,224 filed on May 14, 2024, which is hereby incorporated by reference in its entirety.

FIELD OF THE INVENTION

The present invention relates to wearable devices and systems for location tracking and elopement prevention, specifically utilizing micro-tracking and macro-tracking subsystems.

BACKGROUND OF THE INVENTION

In care environments such as elder care facilities, residents suffering from cognitive impairments like Alzheimer's disease or dementia are particularly susceptible to elopement-leaving the facility without authorization or supervision. Such residents may not be aware of the hazards that exist outside the controlled environment. Once a resident has left the facility, the risk of serious harm or death increases substantially, and recovery efforts become more difficult and time-sensitive. In many cases, even a brief window of unsupervised departure can result in dangerous exposure to traffic, inclement weather, or disorientation in unfamiliar surroundings. Given these risks, there is an urgent and continuing need for systems that do not merely detect elopement after the fact but proactively anticipate and prevent such events in real-time.

Conventional elopement monitoring systems for indoor environments often rely on location-tracking technologies such as Wi-Fi, RFID, Bluetooth, or BLE (Bluetooth Low Energy). While these technologies offer general-purpose tracking capabilities, they are insufficiently precise to provide actionable, real-time location data at the level required to distinguish between normal resident movement and high-risk proximity to an exit. As a result, these systems are prone to both false negatives (e.g., failure to detect an imminent elopement) and false positives (e.g., triggering unnecessary alerts). Furthermore, frequent false positives may cause staff to become desensitized to alerts and ignore legitimate risks.

These conventional systems also typically lack integrated response mechanisms, such as automatically triggering a door lock, activating an audible alarm or voice prompt, or notifying staff through a centralized administrative interface. Instead, they are often passive or reliant on human observation or intervention after a threshold has already been breached. In practice, by the time a system has identified a resident as "missing," the resident may already have exited the facility and moved beyond the protective perimeter.

The need, therefore, is not only for greater location precision, but also for a cohesive, automated system that can respond intelligently and proportionally to evolving risk levels. The ideal system would determine when a resident has entered a high-risk zone (e.g., within a predefined radius of a secure exit), assess the severity of the risk, and trigger appropriate measures such as locking a door, sounding a warning, or alerting staff-all in near real-time. Furthermore, the system must be robust against false positives, which can desensitize staff and erode trust in the alert system.

The present invention addresses the aforementioned and other longstanding deficiencies in the art.

SUMMARY OF THE INVENTION

Embodiments of the present disclosure relate generally to monitoring systems for tracking individuals, particularly those at risk of wandering, including residents of care facilities, or individuals with conditions like dementia. More specifically, the system provides methods for tracking the location of a wearer within a predefined geographical area, such as a facility or residence. The system may utilize peripheral devices to prevent or discourage elopement, as will be described below. The system may also implement methods for tracking the location of a wearer outside of the predefined area, as will be described below.

In accordance with one or more embodiments, the system employs high-precision micro-location tracking using technologies such as ultra-wideband (UWB) communication and ultra-wideband (UWB) anchors to facilitate tracking and preventing elopement events, within the predefined area. A wearable device is worn by and secured to the user, incorporating an integrated UWB module, configured to wirelessly communicate with the one or more UWB anchors. These UWB anchors can determine the wearable device's position with high accuracy, possibly down to a few centimeters or millimeters. The anchors transmit location data to a central processing unit, control software, or server, which can be facilitated by a gateway. This location data is then transmitted further to a backend location and monitoring server, via a network.

In accordance with one or more embodiments, the anchors and/or the gateway are configured to communicate with peripheral devices to prevent or discourage elopement of the user upon detection of an alert condition or triggering event. Such peripheral devices may include, but are not limited to: an access control subsystem, a camera subsystem, an alert messaging subsystem, an alarm/siren subsystem, and a speaker subsystem.

In accordance with one or more embodiments, the access control system includes a door locking mechanism. (As used herein, the terms "access control subsystem" and "door locking mechanism" may be used interchangeably unless a distinction is expressly made or otherwise clear from the context.). The door locking mechanism receives remote lock/unlock instructions from the anchor or the gateway. In this configuration, the anchor or gateway serves as a control device. The anchor may be integrated with the door lock mechanism. Alternatively, the anchor may be an external control device in wired or wireless connection with the door locking mechanism.

In accordance with one or more embodiments, the camera subsystem can be configured for event-based activation, receiving instructions from an anchor or the gateway upon detection of a triggering event by the anchor. The camera system includes one or more interior cameras configured to stream and/or record an attempted elopement. The camera system may be configured with one or more exterior cameras to stream and/or record an actual elopement. The interior and exterior cameras may be equipped with one or more sensors to further facilitate identifying the eloped user.

In accordance with one or more embodiments, the alert messaging subsystem can be configured to transmit alert notifications to various user-operated computing devices, including monitoring station (e.g., an administrative terminal, described below) or a caregiver's device (e.g., a smart phone), and possibly to other computing devices. These devices may support different communication modes, including but not limited to email, text message (SMS), voice call (e.g., VoIP), or other known messaging methods. The alert messaging system can be configured to select the delivery method based on available communication modes of the target device.

In accordance with one or more embodiments, the alarm subsystem can be configured to emit audible alerts through different types of audio output hardware, including built-in speaker modules, shared or pre-existing speaker systems, or dedicated standalone alarm/siren units. Activation of the alarm/siren is based on received control signals from the anchor or gateway. The anchor may be integrated with the alarm/siren system, such as where the alarm/siren includes one or more standalone alarm/siren units. In this implementation, each alarm/siren unit may be integrated with a respective anchor. Alternatively, the anchor may be an external control device in wired or wireless connection with the alarm/siren system.

In accordance with one or more embodiments, a speaker subsystem can be utilized to play pre-recorded or synthesized audio messages to the user, such as to guide them with verbal instructions back to where they belong. The speaker system may utilize integrated speakers, shared public address infrastructure, or standalone speaker units to deliver the audible output. Activation of the alarm/siren is based on received control signals from the anchor or gateway. The anchor may be integrated with the speaker system, such as where the speaker system includes one or more standalone speaker units. In this implementation, each speaker unit may be integrated with a respective anchor. Alternatively, the anchor may be an external control device in wired or wireless connection with the speaker system.

In accordance with one or more embodiments, the UWB anchors, may be mounted or movable/portable within the predefined area/facility. Additionally, the system can utilize escort UWB anchors, which may be smartphones or other computing devices equipped with UWB modules, each of which can be paired with the user's wearable device for continued monitoring and tracking outside of the facility/predefined area.

In accordance with one or more embodiments, when the wearable device travels outside the predefined area, or loses the short-range communication link, the system activates macro-tracking options. This is typically achieved using a GPS/GNSS receiver integrated into the wearable device, which determines the user's general location (referring to the wearable device) via GPS/GNSS satellite positioning systems. A significant advantage of this dual-mode system is that the micro-location tracking methods, such as those employing UWB, are typically lower power consuming as compared to higher power consuming systems like GPS/GNSS. The system may be configured to only resort to switching to the macro-tracking option/system when necessary, such as when the user (referring to the wearable device) leaves the predefined area or loses the short-range connection to the anchor(s), specifically to conserve battery life of the wearable device.

In accordance with one or more embodiments, the power source for the wearable device may be a battery or other source of electric current. A battery power management circuit monitors and controls the distribution of power to the device's circuits (e.g., to appropriately activate and deactivate the micro and macro tracking subsystems to extend battery life). The cellular modem and the GPS unit can be deactivated when in the indoor idling state to conserve power. In one embodiment, when the main/primary battery is becoming depleted in energy or has deteriorated to a certain level, the system may enter a low power outdoor state where the cellular modem and GPS unit are placed in standby mode or disabled. In another embodiment, the wearable device is configured to operate on a backup battery if the main battery is totally depleted.

In accordance with one or more embodiments, the wearable device is equipped with two distinct batteries: a first battery specifically dedicated to powering the regular components and micro-tracking features, and a second, separate backup or secondary battery specifically assigned for powering the macro-tracking features when needed.

BRIEF DESCRIPTION OF DRAWINGS

FIGS. 6A and 6B are diagrammatic views illustrating an elopement prevention aspect of the system in operation in a residence or facility, according to one or more embodiments shown or described herein.

FIG. 8B is a schematic diagram illustrating an example zonal monitoring layout used in tracking system employing multiple anchors for micro-tracking for overlapping coverage within inner and intermediate zones, and macro-tracking in the out-of-bounds zone, according to one or more embodiments shown or described herein.

FIG. 10 is as table identifying various system devices, the communications protocols they use, and their respective roles within the system, according to one or more embodiments shown or described herein.

DETAILED DESCRIPTION OF THE INVENTION

Figure 1A:
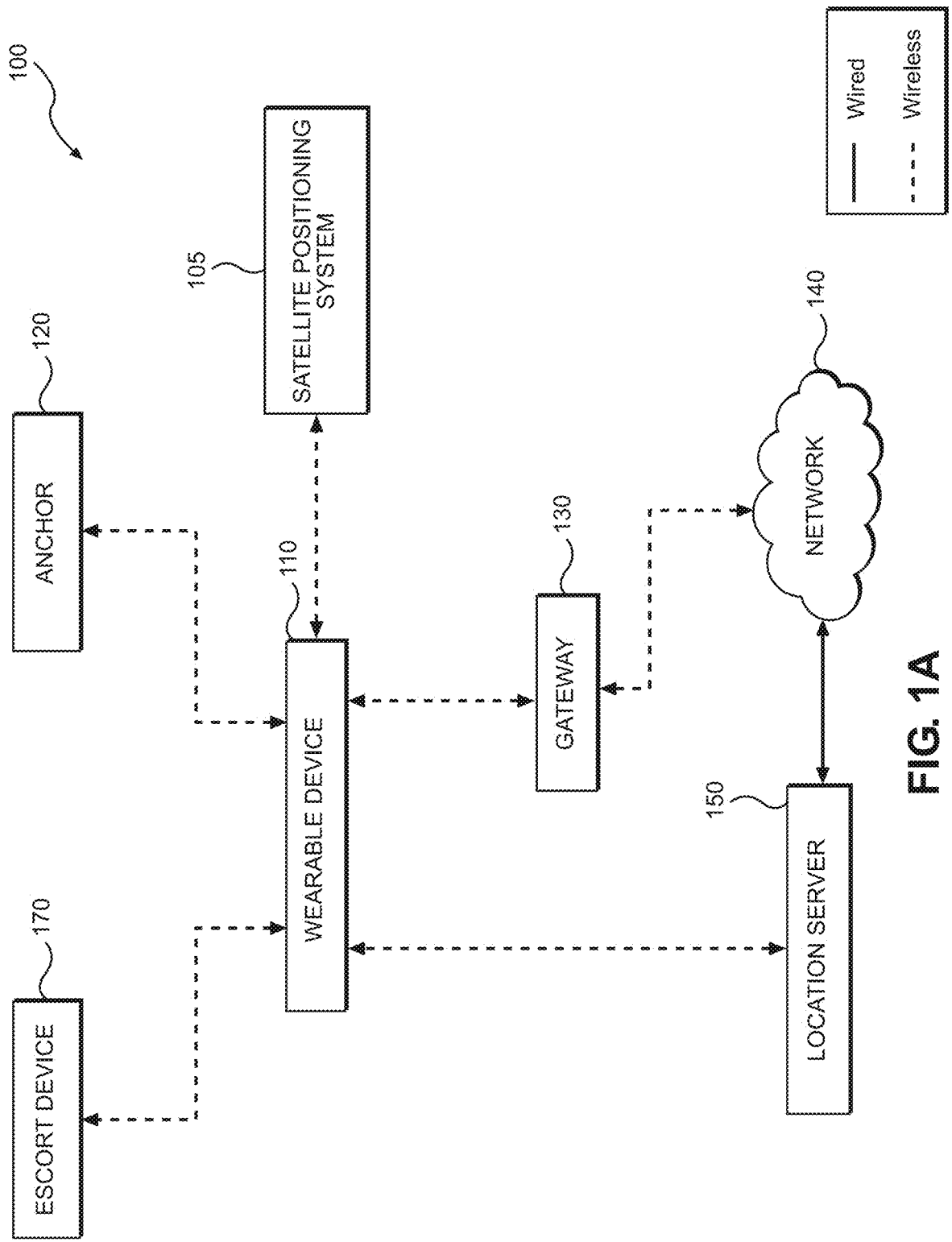
FIG. 1A is a diagram illustrating an example system architecture in which a wearable device is communicatively coupled to various system components, including fixed-location anchors, an escort device (i.e., mobile anchor), a gateway, a backend location server, and a satellite positioning system, according to one or more embodiments shown or described herein.

Embodiments of the present disclosure relate generally to monitoring systems for tracking individuals, particularly those at risk of wandering, including residents of care facilities, or individuals with conditions like dementia. More specifically, the system provides methods for tracking the location of a wearer within a predefined geographical area, such as a facility or residence. The system may utilize peripheral devices to prevent or discourage elopement, as will be described below. The system may also implement methods for tracking the location of a wearer outside of the predefined area, as will be described below.

In one aspect, a wearable device, which may be integrated into an article worn on the body (e.g., wristband, ankle band, badge), includes a UWB module/tag capable of communicating with UWB anchor devices deployed within the facility or even outside of the facility. Depending on the arrangement and function of the UWB anchors, the system may be configured to serve one or more of the following objectives: (1) elopement prevention, (2) continuous presence and tamper monitoring, (3) micro-location tracking of the wearable device, and (4) macro-location tracking of the wearable device.

In a first embodiment, the system is configured primarily for elopement prevention. UWB anchors are deployed near predefined exit points or restricted zones within the facility. The system passively monitors for the presence of a wearable device within a detection range of these anchors. If a tag enters an exit zone, predefined actions such as, but not limited to, triggering an alarm, activating one or more cameras or other sensors, activating one or more speakers, notifying staff by electronic communication, or locking one or more exit doors may be initiated.

In a second embodiment, the system ensures that the wearable device remains functional and properly affixed. This is achieved through continuous presence monitoring, where UWB anchors are placed strategically throughout the facility to ensure that at least UWB one anchor maintains contact with each wearable device at any given time. If the system detects a signal loss—due to device tampering, removal, or destruction—an alert is triggered. This embodiment prioritizes device integrity and compliance without necessarily determining precise location coordinates.

In an alternative implementation of each of the previously described first and second embodiments, a single UWB anchor positioned near a specific exit door may be sufficient to detect and prevent elopement and to monitor the wearable device for tampering, such as in cases where a resident is confined to their room due to health or mobility limitations. In yet another alternative embodiment, a single UWB anchor positioned near a particular door may suffice where the door leads to a restricted area—such as for safety or security reasons—and it is only necessary to prevent entry into that area. The restricted area may, for example, be an open space or include multiple branching doors or hallways, making it more difficult to secure again potential elopement.

In a third embodiment, the system provides micro-location tracking capabilities. Multiple UWB anchors are distributed throughout the facility in a manner that enables triangulation or multilateration of the wearable device's position in real time. This configuration supports high-resolution tracking and can be used to monitor behavioral patterns, detect loitering in or near restrictive areas, or provide advanced analytics. This embodiment may incorporate the features of the first two embodiments, adding precision location awareness as a functional layer.

In a fourth embodiment, which is a modification of the previously described third embodiment, the system further provides macro-tracking capabilities. The wearable device determines its position outside of the facility using an integrated GNSS/GPS receiver that processes signals from satellite positioning systems.

For clarity of exposition, the foregoing description presents a "first embodiment," a "second embodiment," a "third embodiment," and a "fourth embodiment," and some alternative embodiments thereof, each emphasizing different operational objectives. These embodiments are not mutually exclusive. Unless explicitly stated otherwise, any feature, function, component, or step described with respect to one embodiment may be implemented individually or in any practicable combination with features, functions, components, or steps of the other embodiments. References to "first," "second," "third," and "fourth" embodiments (and similar language) are used solely for convenience of description and do not imply an order, priority, or limitation on the possible combinations, integrations, or substitutions of the disclosed elements.

Throughout the disclosure, reference is made to various combinations of hardware elements, including UWB tags, anchors, and control systems, as well as software logic for interpreting tag data and executing responsive actions. While specific implementations are described in detail, it will be understood that variations in architecture, signal protocols, and data analysis methods may be employed without departing from the scope of the invention.

Reference will now be made in detail to the accompanying figures, in which like reference numerals are used to designate corresponding elements throughout the various views. The following discussion relates to various embodiments of the invention and is intended to provide a comprehensive understanding of the features and functionality of the disclosed systems and methods. The embodiments described herein may be combined, rearranged, or modified in various ways without departing from the scope of the invention. It should be understood that while specific implementations and examples are provided for illustrative purposes, the scope of the invention is not limited to the particular forms disclosed.

Throughout FIGS. 1A through 1F, reference numeral 100 is used to refer to the system as a whole, in accordance with various embodiments of the present disclosure. Each figure may illustrate a subset of components within system 100, with emphasis on a particular device or sub-configuration. Not all system components are shown in every figure. The absence of a particular component from a given figure may indicate that it is not relevant to the operational focus of that view, such as a device with which the illustrated components are not presently communicating or interacting in that embodiment or configuration.

Communication or interaction between components may occur through various types of connections, including wired and wireless links, or through intermediary systems or networks. A given component may support multiple modes of communication, and the specific type used may vary depending on the system configuration or implementation.

While the following discussion primarily refers to the system-level illustration in FIG. 1A, occasional reference will be made to FIG. 2A, which depicts internal components of a particular device relevant to this discussion. To distinguish references to FIG. 2A, the corresponding reference numerals from that figure will appear in parentheses.

Figure 2A:
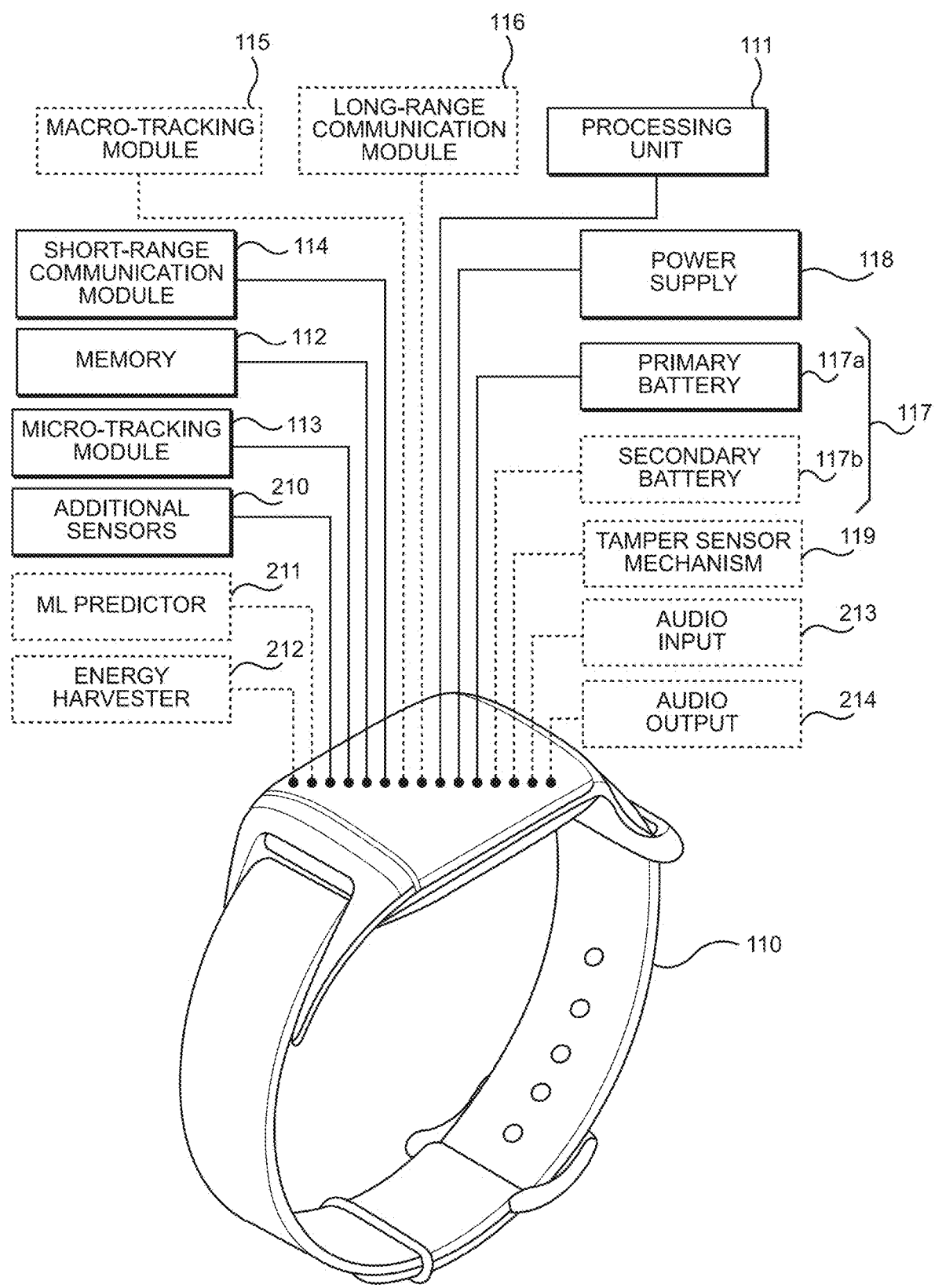
FIG. 2A is a perspective view of the wearable device of FIG. 1A, with labels indicating example internal components, according to one or more embodiments shown or described herein.

Referring primarily to FIG. 1A, with additional reference to FIG. 2A, a system 100 is illustrated for monitoring the status and/or tracking the location, of one or more wearable devices 110, in accordance with various embodiments described herein. As shown in FIG. 2A, the system 100 includes a micro-tracking subsystem, which is depicted and described as part of each embodiment illustrated and discussed throughout this disclosure. Also shown in FIG. 2A is a macro-tracking subsystem, which may be included in one or more embodiments of the system 100, depending on the particular implementation. The configuration, interconnection, and functionality of these subsystems may vary across embodiments, as further described below with reference to subsequent figures.

Each of the micro and macro subsystems described herein includes two primary components: a tracking module and a communication module. In particular, the micro-tracking subsystem includes a micro-tracking module 113 and a short-range communication module 114, and the macro-tracking subsystem includes a macro-tracking module 115 and a long-range communication module 116. These components are individually identified and labeled in the figures; however, the subsystems themselves may not be expressly labeled by name in every illustration. Accordingly, references in this disclosure to a given subsystem should be understood to collectively refer to the associated tracking and communication modules, or, in context, may refer specifically to the tracking module (113, 115) as the primary functional component being described, as will be apparent from the surrounding description.

The system 100 further includes one or more UWB (ultra-wideband) anchors 120 for indoors use, a mobile anchor 170 for indoor and/or outdoor use, a gateway device 130, and a backend location server 150 connected via a network 140. As used herein, the terms "mobile anchor," "escort device," and "escort anchor" may be used interchangeably and are intended to refer to the same or substantially the same component, unless otherwise specified.

The wearable device 110 is configured to be worn by a user and includes various integrated modules or subsystems—in addition to the previously described micro and macro subsystems—for other functions. The micro-tracking module (113) of the wearable device 110 includes a UWB tag configured to establish high-precision ranging and location calculations through signal exchange with the UWB anchors 120. These UWB interactions allow for precise micro-location tracking in environments where such anchors 120 are installed, such as through time-of-flight or two-way ranging measurements. The UWB anchors 120 may be strategically positioned within a known environment and serve as reference points for the UWB-based ranging system. The UWB anchors 120 may be synchronized via wired or wireless means to maintain system accuracy.

The wearable device 110 further includes the previously described short-range communication module (114), which may utilize Bluetooth, Wi-Fi, or similar protocols to communicate with a nearby gateway device 140 when within range. This communication link facilitates the transmission of operational data other than location data (e.g., device status information or sensor information) from the wearable device 110 to the gateway 130 for further relay to the location server 150.

In the embodiments described herein, the short-range communication module (114) is utilized for transmitting and/or receiving certain types of data or signals, but not others. In particular, the short-range communication module (114) is not configured, in the present examples, to transmit location data. However, it should be understood that the short-range communication module (114) may be configured to support such functionality, depending both on its own implementation and the corresponding capabilities and configuration of the device or system with which it communicates (e.g., anchors 120). Accordingly, while certain features are not illustrated or described as part of the short-range communication module (114) in the present embodiments, they are not excluded from the scope of the disclosure.

In one or more embodiment described herein, the wearable device 110 also incorporates the previously described macro-tracking module (115) for outdoor or broader-area tracking. In particular, the macro-tracking module (115) includes a GPS or GNSS receiver. The macro-tracking module (115) enables the wearable device 110 to acquire satellite-based location data when UWB coverage is unavailable or limited. To ensure that such macro-location data can be transmitted even when short-range communication is not possible, the wearable device 110 includes the long-range communication module (116), which may utilize low-power wide-area network (LPWAN) technologies such as LoRa, LTE-M, or NB-IoT to send GPS or GNSS data directly to the location server 150, either via the gateway 130 or through the network 140 independently.

The system may further include a mobile anchor or "escort device" 170, which functions as a portable UWB reference node. This escort device 170 can be paired with one or more wearable devices 110 to enable ad hoc or dynamic micro-location tracking. This is particularly useful in environments where permanent UWB infrastructure is not available (e.g., outdoors) or where movement through multiple zones is required. The escort device 170 may also be capable of collecting and relaying the location of the wearable device to the location server 150, either directly (e.g. using cellular data) or through the gateway 130.

Figure 1B:
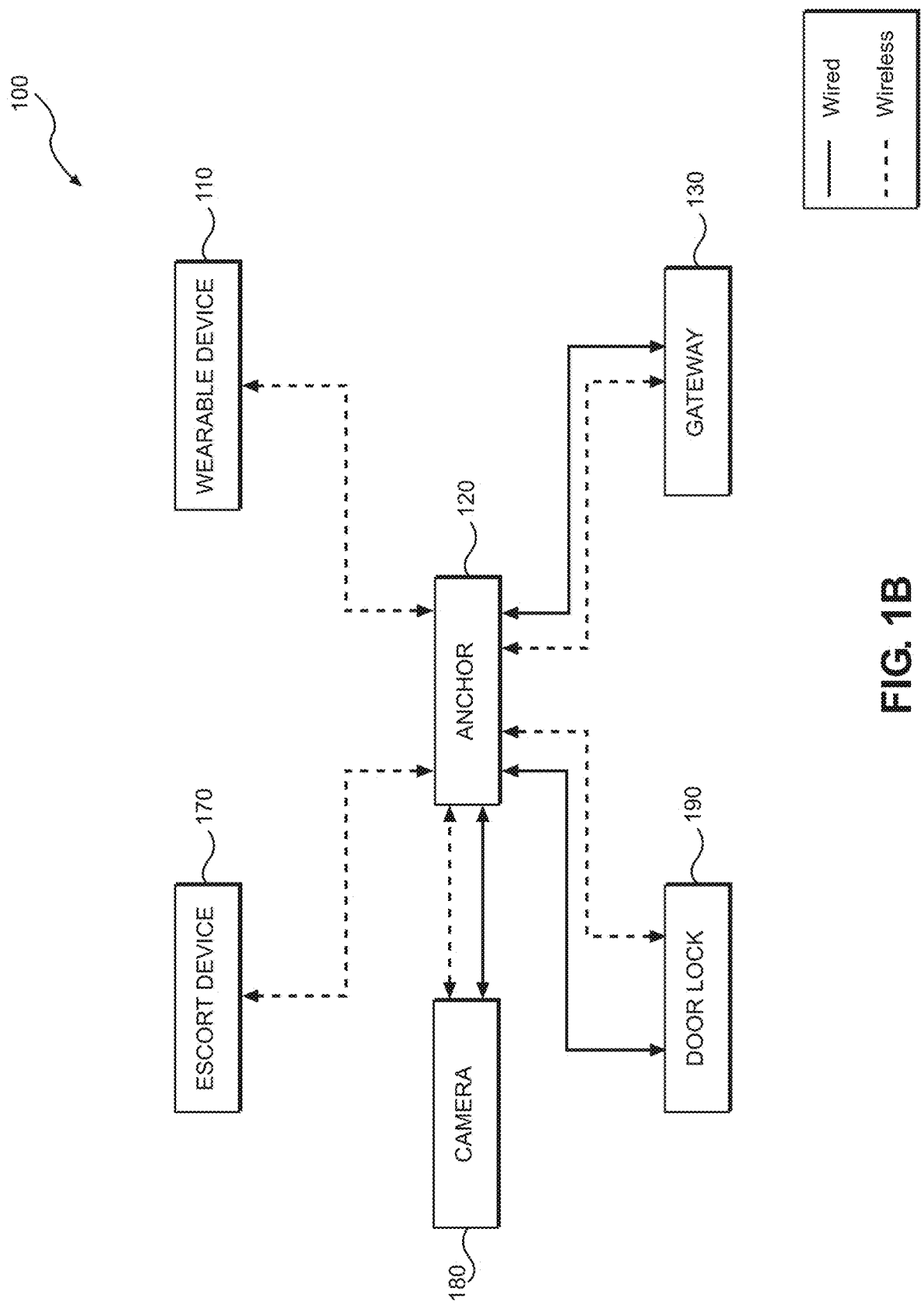
FIG. 1B is a diagram illustrating an example configuration in which the fixed-location anchor shown in FIG. 1A is communicatively coupled to various system components, according to one or more embodiments shown or described herein.
Figure 1C:
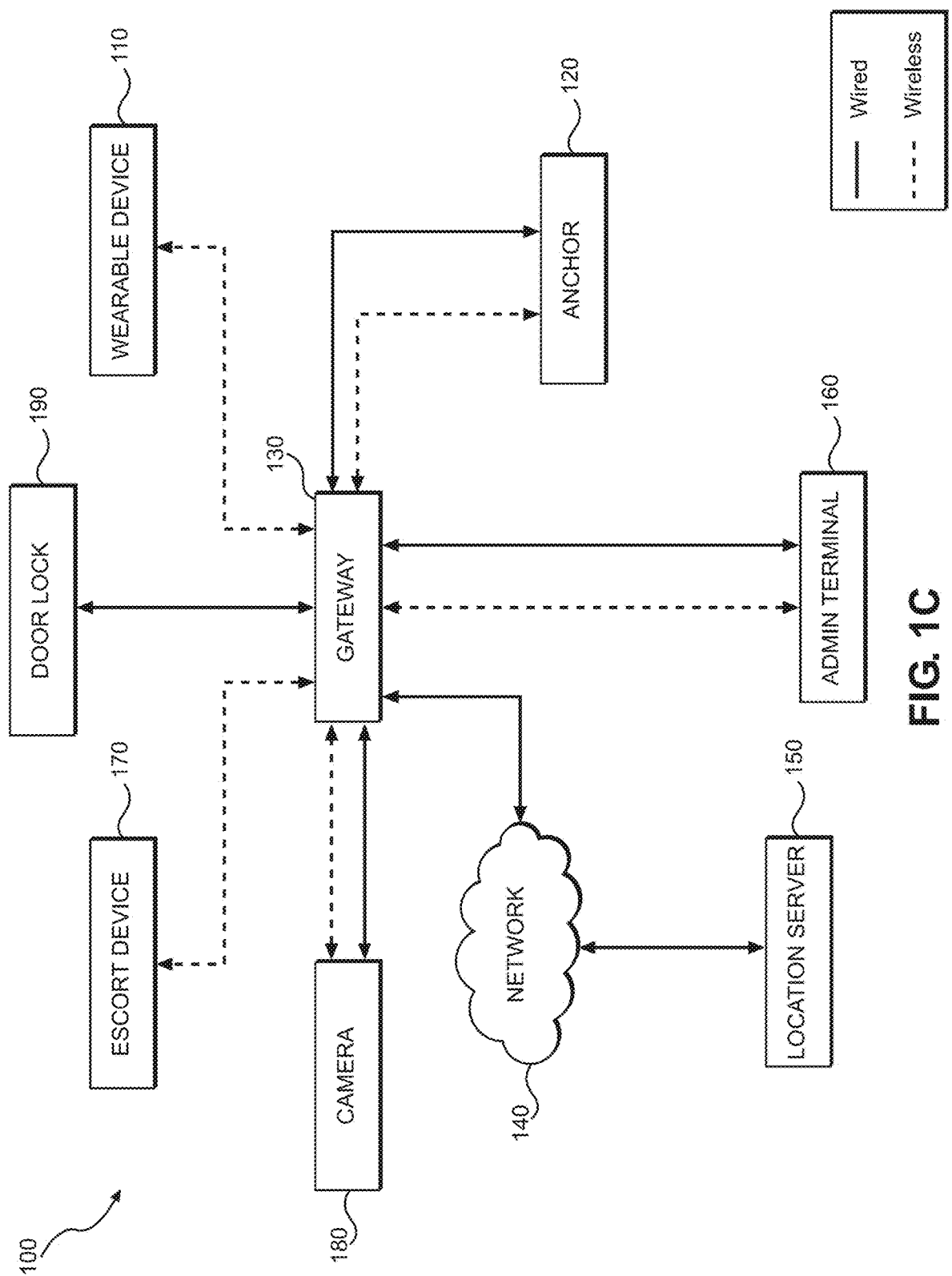
FIG. 1C is a diagram illustrating an example configuration in which the gateway shown in FIG. 1A is communicatively coupled to various system components, according to one or more embodiments shown or described herein.

The gateway device 130 acts as an intermediary between various devices in the system 100 and the location server 150, as shown in FIG. 1C. The gateway 130 receives data from the wearable device 110 via short-range communication and relays this data to the location server 150 using a more robust connection such as Ethernet, cellular, or Wi-Fi. In some implementations, the gateway may also coordinate timing or synchronization data for the UWB anchors (120, 170) and facilitate command-and-control signaling between the location server 150 and the wearable device 110.

The backend location server 150 is configured to receive and process both micro-location and macro-location data from multiple wearable devices 110. The location server 150 may store, analyze, and display location data, enabling tracking of individuals or assets in real time. It may also perform location fusion to combine data from UWB and GPS/GNSS sources to provide seamless location tracking across indoor and outdoor environments. The location server 150 may further provide APIs or user interfaces for monitoring, alerting, or integration with external systems.

In operation, the wearable device 110 autonomously determines its position through either UWB interactions or GPS/GNSS acquisition, depending on environmental conditions and infrastructure availability, as previously described. When the wearable device 110 is within range of one or more UWB anchors 120, the UWB signals received by the UWB anchors 120 are used to determine location data of the wearable device 110. The UWB anchor(s) 120 transmit information related to the determined location data to the location server, typically via the gateway 130. When out of range, or in low-power scenarios, the wearable device 110 may switch to the long-range communication module (116) to ensure continued location tracking and data transmission to the location server 150. If the wearable device 110 is paired with an escort device 170, the system 100 can determine the relative or absolute position of the wearable device with respect to the escort device 170. This feature is especially valuable in use cases where an escort or mobile supervisor needs to monitor proximity or alignment with a specific individual. The escort device 170 may, for instance, be a smartphone equipped with GNSS/GPS for location tracking and UWB communication capability for interacting with the wearable device's UWB tag.

The location server 150 may be configured to transmit control signals or configuration updates to the wearable device 110, either via the gateway 130 or over the network 140, enabling dynamic management of tracking parameters, reporting intervals, or pairing assignments. The system 100 therefore provides an integrated, hybrid solution for continuous and scalable location tracking in both structured and unstructured environments.

Throughout the views in FIG. 1A through FIG. 1F, communication pathways are depicted using solid and dashed line arrows, where solid lines represent wired connections and dashed lines represent wireless connections. These depictions are intended to demonstrate possible implementations and are not limiting; the actual implementation may vary based on operational or environmental factors. The inclusion of specific pathways or devices in the figure does not exclude the possibility of additional connections or configurations not explicitly shown, and is not intended to restrict the scope of the system.

Returning now to the figures, FIGS. 1A through 1F illustrates various exemplary communication pathways between devices or components within the system 100, with each figure focusing on a different device as a central node. Each figure depicts the respective focal device interacts with other system components.

FIG. 1A illustrates a representative system architecture in which the wearable device 110 is shown in communication with various other components in the system 100. The wearable device 110 may be communicatively or operatively coupled to indoor UWB anchors 120, a mobile anchor or escort device 170, a gateway 130, and a backend location server 150. The wearable device also includes macro-tracking capabilities (see FIG. 2A) and is communicatively coupled to a satellite positioning system 105 (e.g., GPS/GNSS) for acquiring global location data.

FIG. 1B illustrates an example configuration in which an indoor UWB anchor 120—which may be mounted on a wall or portable within the indoor environment, such as having motorized wheels—is centrally positioned and shown in communicative or operative connection with several system 100 components. The UWB anchor 120 may be coupled to the wearable device 110 (as described in FIG. 1A), an escort device 170, a gateway 130, a camera subsystem 180, and a door locking subsystem 190. These connections may include both wired and wireless communication links, as denoted respectively by solid and dashed line arrows.

FIG. 1C illustrates a system configuration in which a gateway 100 is centrally depicted and is communicatively or operatively coupled to a variety of other components in the system 100. These include the wearable device 110 (as shown in FIG. 1A), UWB anchors 120 (as shown in FIG. 1B), the escort device 170, the backend location server 150

(via network 140), an administrative terminal 160 (also referred to herein as an admin terminal), the camera subsystem 180, and the door locking subsystem 190. Communication pathways are shown using solid and dashed line arrows to indicate wired and wireless connections, respectively.

Figure 1D:
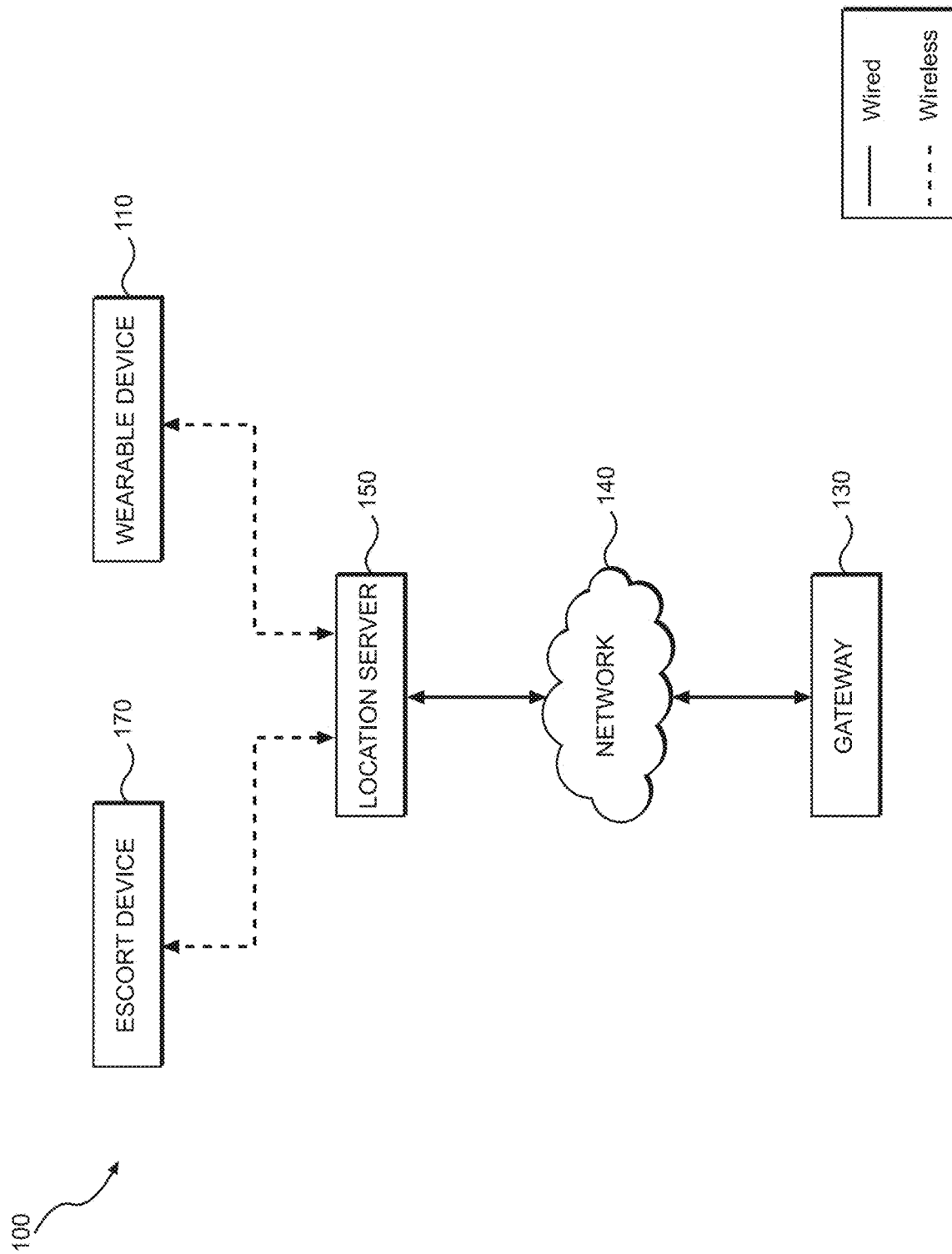
FIG. 1D is a diagram illustrating an example configuration in which the backend location server shown in FIG. 1A is communicatively coupled to various system components, according to one or more embodiments shown or described herein.

FIG. 1D illustrates a system configuration in which a backend location server 150 is centrally positioned and is communicatively or operatively coupled to other system 100 components. These include the wearable device 110 (as shown in FIG. 1A), the escort device 170, and the gateway 130 via network 140 (as shown in FIG. 1C). Communication pathways are again indicated using solid and dashed line arrows, representing wired and wireless links, respectively.

Figure 1E:
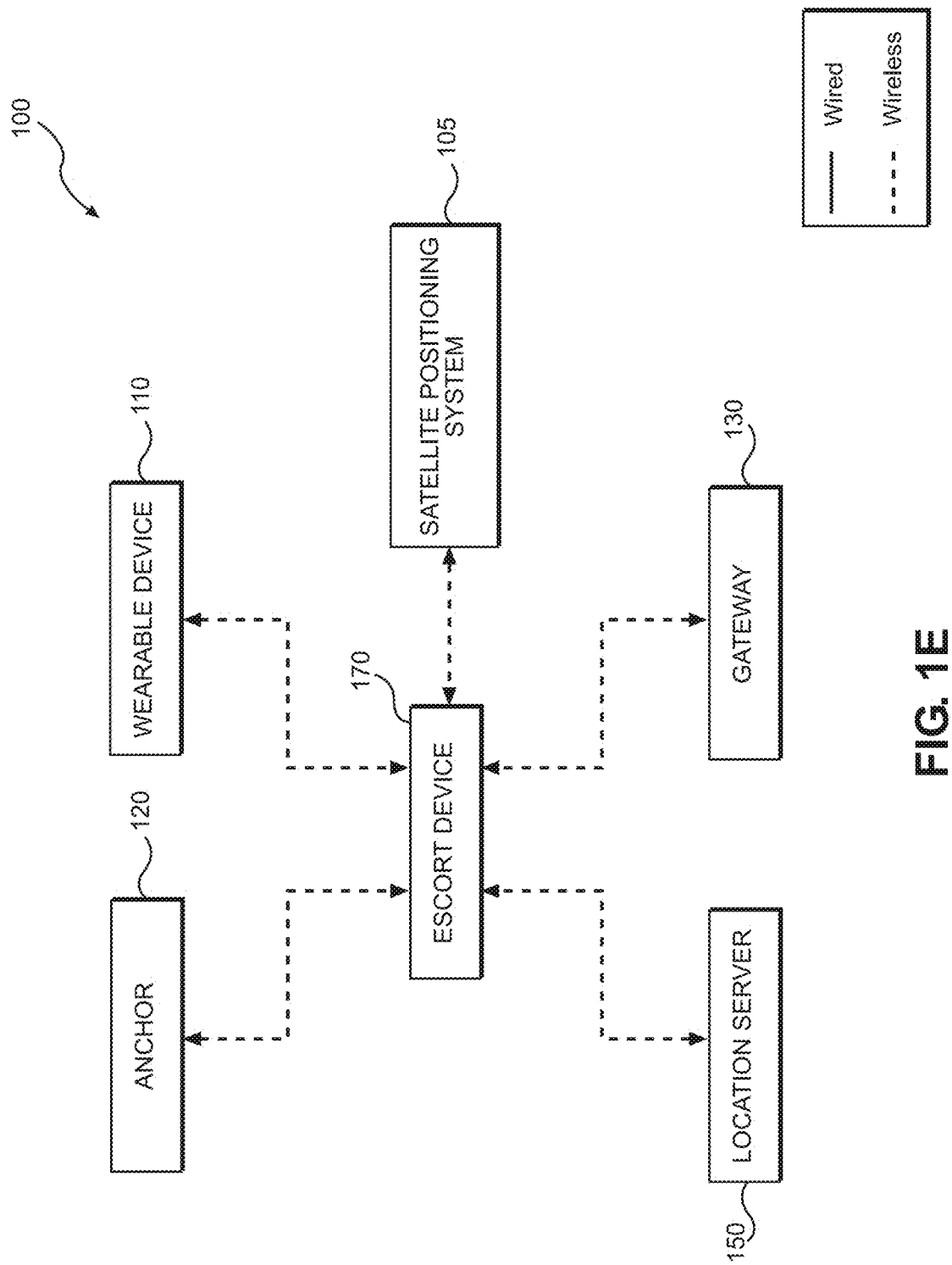
FIG. 1E is a diagram illustrating an example configuration in which the escort device shown in FIG. 1A is communicatively coupled to various system components, according to one or more embodiments shown or described herein.

FIG. 1E illustrates a system configuration in which the escort device 170 (also referred to herein as the "mobile anchor" or "escort anchor") is centrally shown and is communicatively or operatively coupled to several other devices within the system 100. These include the wearable device 110 (as shown in FIG. 1A), the UWB anchor 120 (as shown in FIG. 1B), the gateway 130 (as shown in FIG. 1C), the backend location server 150 (as shown in FIG. 1D), and a satellite positioning system 105 for acquiring GPS or GNSS location data. All communication pathways in this figure are illustrated with dashed line arrows to indicate wireless connections.

Figure 1F:
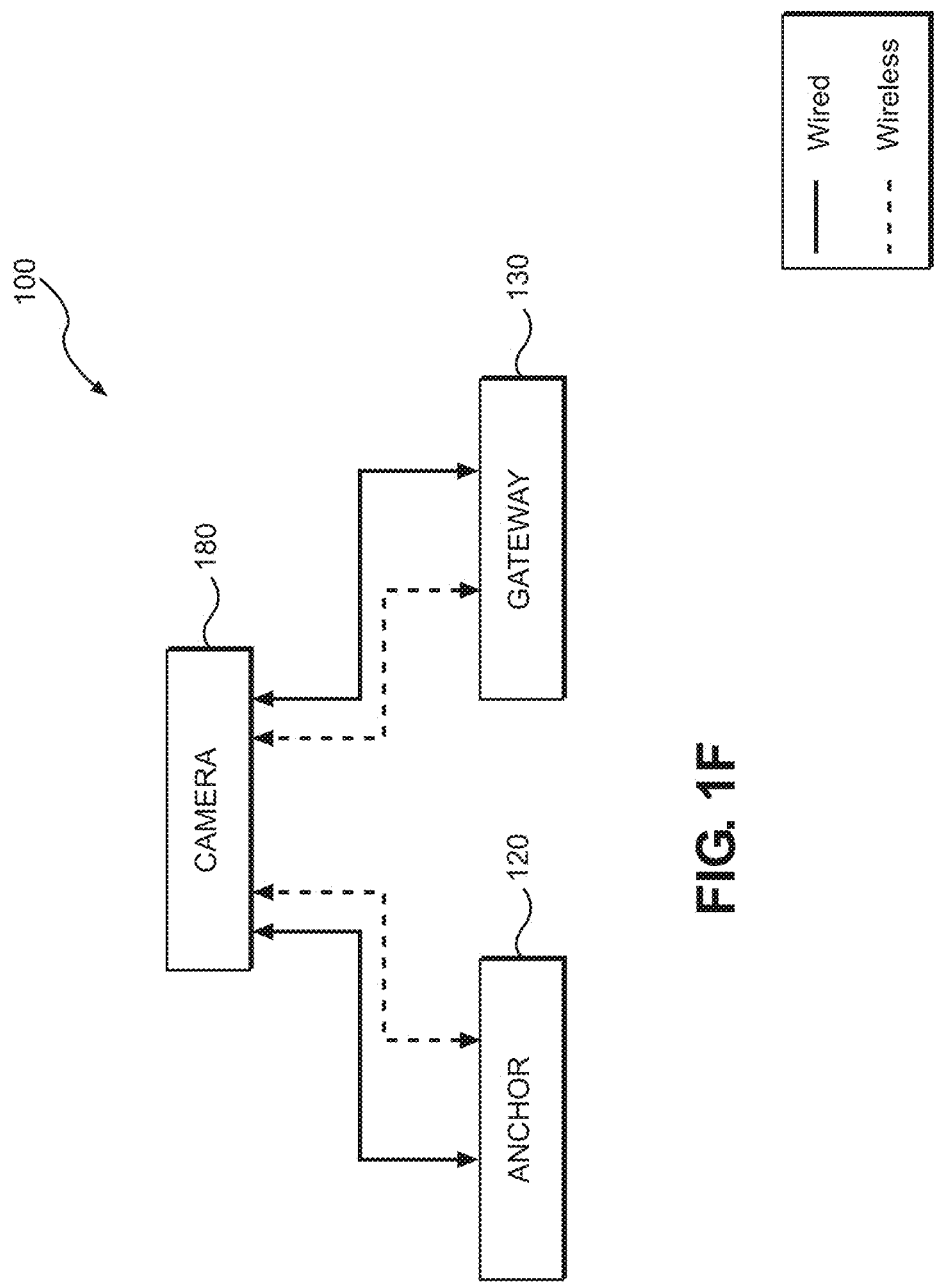
FIG. 1F is a diagram illustrating an example configuration in which a camera system is communicatively coupled to various system components, according to one or more embodiments shown or described herein.

FIG. 1F illustrates a system configuration in which the camera subsystem 180 is centrally positioned and is shown as being communicatively or operatively coupled to other system 100 components. These include the UWB anchor 120 (as described in FIG. 1B) and the gateway 130 (as shown in FIG. 1C). The connections are depicted using solid and dashed line arrows, representing wired and wireless links, respectively. This figure is intended to show possible integrations of the camera subsystem 180 within the broader tracking and monitoring system 100 and is not meant to be limiting.

FIGS. 2A through 2H illustrate example devices, components, and subsystems that may form part of the system 100 described in connection with FIGS. 1A through 1F. FIG. 2A is a perspective view of an example device, with labeled text boxes identifying internal components. FIGS. 3B through 3H are block diagrams that illustrate the internal structure and functional components of various devices, components, or subsystems within the system 100. These figures are provided to enhance clarity and support the disclosed embodiments. While specific arrangements are shown, the configurations are illustrative and may vary depending on implementation.

Referring now to FIG. 2A, a block diagram is shown illustrating the internal components of a wearable UWB tag device 110 configured for micro-tracking operations, and optionally for macro-tracking operations. As previously described, in one or more embodiments, the wearable device 110 is configured for micro-tracking operations only (i.e., meaning, it is not configured for macro-tracking operations), while in additional embodiments, the wearable device 110 is further configured for macro-tracking operations as well. The device 110 is typically worn or attached to a person, animal, or mobile asset and is capable of dynamically switching between localized and wide-area tracking modes based on connectivity conditions.

As depicted in FIG. 2A, the wearable device 110 includes a micro-tracking module 113, which includes a UWB transceiver module that facilitates micro-tracking by engaging in short-range, high-precision ranging communication with one or more of the indoor or mobile UWB anchor devices (120, 170). The micro-tracking module 113 operates under the control of a processor 111, which also oversees communication management and mode switching logic. A short-range communication module 114, such as a Bluetooth or Wi-Fi interface, is provided to enable the wearable device 110 to communicate with nearby infrastructure, including the gateway (130). As a non-limiting example, this interface may be used to receive configuration updates while conserving battery resources.

To enable macro-tracking, the wearable device 110 includes a macro-tracking module 115, which includes a GPS and/or GNSS module for acquiring global position information from a satellite positioning system (105). When the wearable device 110 is determined to be outside the range of UWB anchors (120, 170), the device 110 transitions to macro-tracking mode, activating the long-range communication module 116, which may include cellular, LoRa, LTE-M, or other low-power wide-area (LPWAN) radios. The long-range communication module 116 enables direct communication with the backend location server (150), which may be configured to receive GPS-derived location data and other telemetry from the wearable device 110. In one or more embodiments, a backend communications interface associated with the backend location server (150) may act as an initial recipient, processing or forwarding the data as needed.

A memory module 112 stores operational data, firmware, and mode transition history. A battery 117 and power management system 118 supplies energy to the wearable device 110, with system configuration favoring micro-tracking mode where possible due to its reduced power consumption relative to macro-tracking. The "power management system 118" may be referred to herein interchangeably as "power supply 118."

Additional optional components include a secondary or backup battery 117b (described below in further detail in connection with FIG. 13), a tamper sensor mechanism 119 (see FIG. 12, described below), one or more additional sensors 210, which may include motion or environmental sensors 210, such as accelerometers, gyroscopes, or temperature sensors, a machine-learning (ML) predictor 211, an energy harvester 212, an audio input 213 (e.g., a microphone), and an audio output 214 (e.g., a speaker). Additionally, other components such as a user notification interface may be provided. The user notification interface may include, but is not limited to, a display screen, and LEDs, sound, or haptic feedback.

The machine-learning predictor 211 may refer to a software-implemented module configured to analyze input data and generate predictive outputs based on one or more trained machine-learning models. For example, in the context of the disclosed embodiments, the predictor 211 may evaluate historical and real-time data from the wearable device 110, other wearable devices 110 that enter within sensing range, anchors (120, 170), and other sensors or devices, to assess the likelihood of elopement or other behavior suggesting the need for intervention.

The energy harvester 212 refers to a component configured to capture and convert ambient energy—such as light, thermal, or kinetic energy—into electrical energy for use by the device. As a non-limiting example, the energy harvester 212 may include a photovoltaic cell (e.g., a solar cell) that converts ambient light into power to supplement or recharge the wearable device's battery 117. Other non-limiting examples may include thermoelectric generators, piezoelectric elements, and RF harvesting circuits.

As previously described, the wearable device 110 is configured to automatically transition from micro-tracking mode to macro-tracking mode when it no longer detects UWB anchor signals, and to revert back to micro-tracking mode when UWB communication is reestablished. This context-aware switching conserves power while maintaining continuous tracking of the person to which the device is attached/secured.

Figure 2B:
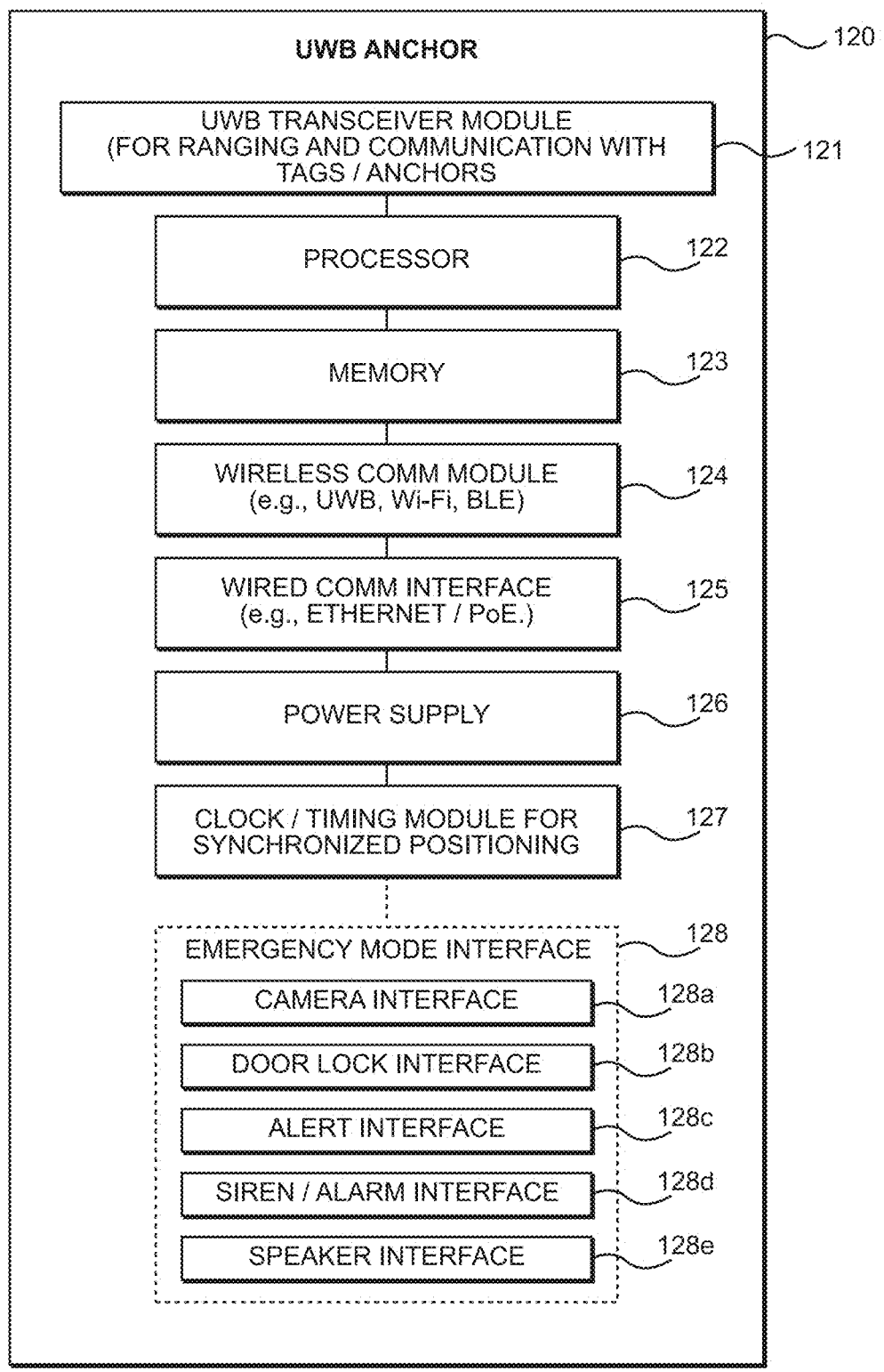
FIG. 2B is a block diagram showing the fixed anchor of FIG. 1B, with nested sub-blocks illustrating example internal sub-components, according to one or more embodiments shown or described herein.

Referring now to FIG. 2B, a block diagram is shown illustrating the internal components of an indoor ultra-wideband (UWB) anchor 120. The anchor 101 includes a UWB transceiver module 121 configured to perform ranging and data communication with one or more UWB tags (such as integrated with wearable device 110) and other UWB anchors (such as other UWB anchors 120 and escort device/anchors 170). A processor 122 is operatively coupled to the UWB transceiver 121 and is configured to manage communications, process received data, and perform local control functions. A memory 123 is provided to store configuration data, operational firmware, and transient data associated with the anchor's operation. The UWB anchor 120 may include one or more communication interfaces, including a wireless communication module 124, such as a Wi-Fi or Bluetooth interface, and a wired communication interface 125, such as Ethernet or Power-over-Ethernet (POE), to enable communication with peripheral devices and/or the gateway 130. A clock or timing module 127 may be included to support synchronization of ranging data, particularly in systems that require time-difference-of-arrival (TDOA) positioning. The UWB anchor 120 may also include a power supply module 126, which may be connected to a fixed power source or include battery backup. In some embodiments, the anchor 101 may interface with an external or integrated subsystems. In one or more embodiment, UWB anchor 120 is configured with an emergency mode interface 128 for initiating or managing communication with one or more external or onboard subsystems, including, but not limited to, a camera subsystem (via interface 128a), a door locking subsystem (via interface 128b), an alert messaging subsystem (via interface 128c), a siren/alarm subsystem (via interface 128d), and a speaker subsystem (via interface 128e).

Figure 2C:
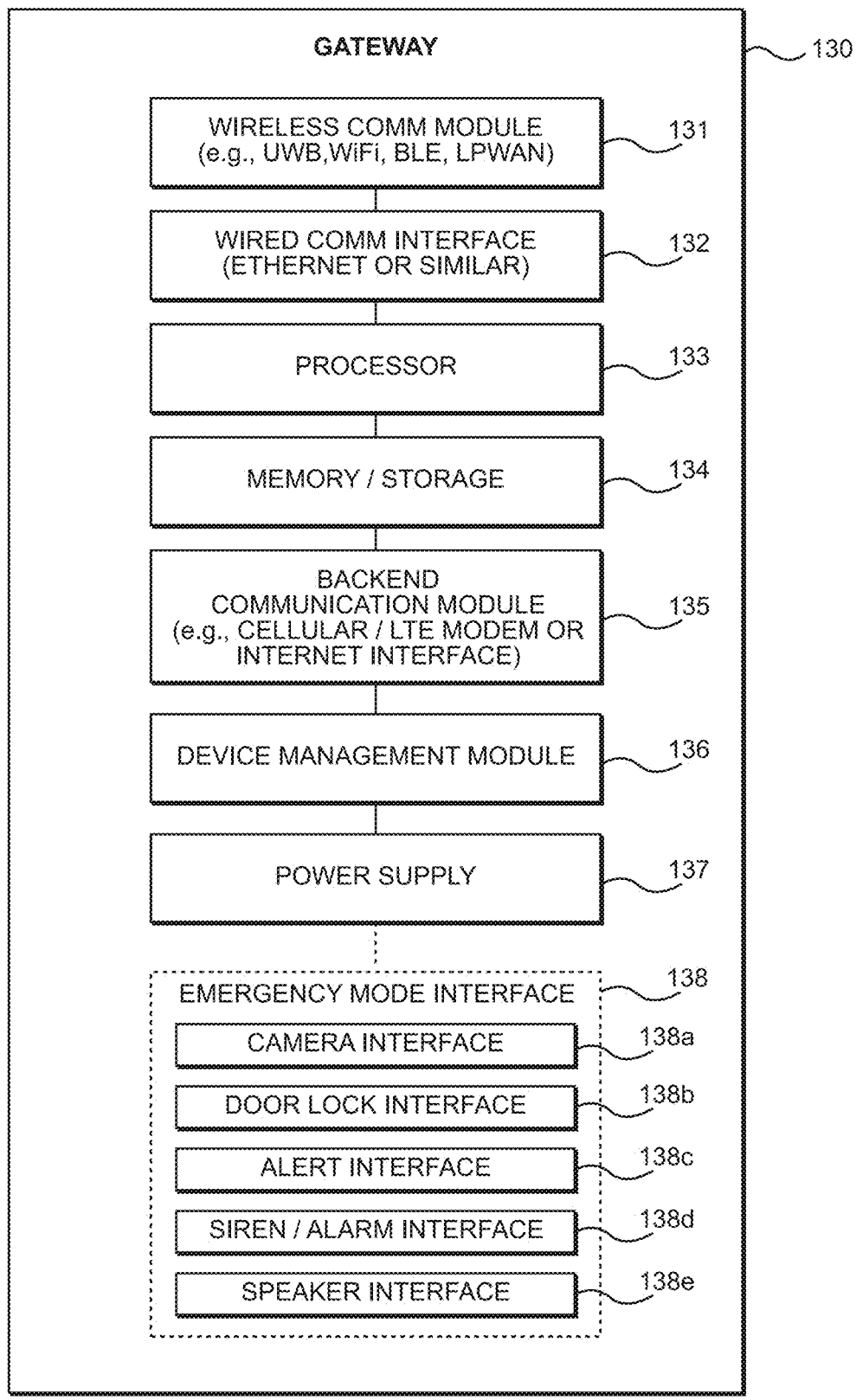
FIG. 2C is a block diagram showing the fixed gateway of FIG. 1C, with nested sub-blocks illustrating example sub-components, according to one or more embodiments shown or described herein.

Referring now to FIG. 2C, a block diagram is shown illustrating the internal components of a gateway device 130. The gateway 130 serves as a central communication hub for on-site devices and includes one or more communication interfaces. These may include a wireless communication module 131, such as Wi-Fi or Bluetooth, and a wired communication interface 132, such as Ethernet, to interface with local UWB anchors (120), escort devices/anchors (170), and other peripheral equipment, as previously described in connection with FIG. 1C. The gateway further includes a processor 133 that performs routing, filtering, and protocol translation functions. A memory 134 is provided to store configurations, credentials, and transient data. A backend communication module 135, which may include cellular, Wi-Fi, or other internet-accessible interfaces, enables the gateway 130 to send data to and receive data from an off-site backend location server (150). A device management module 136 may be included to handle authentication, access control, and session management between connected devices. A power supply module 137 powers (or regulates power to) the gateway 130. In one or more embodiment, gateway 130 is configured with an emergency mode interface 138 for initiating or managing communication with one or more external or onboard subsystems, including, but not limited to, a camera subsystem (via interface 138a), a door locking subsystem (via interface 138b), an alert messaging subsystem (via interface 138c), a siren/alarm subsystem (via interface 138d), and a speaker subsystem (via interface 138e).

Figure 2D:
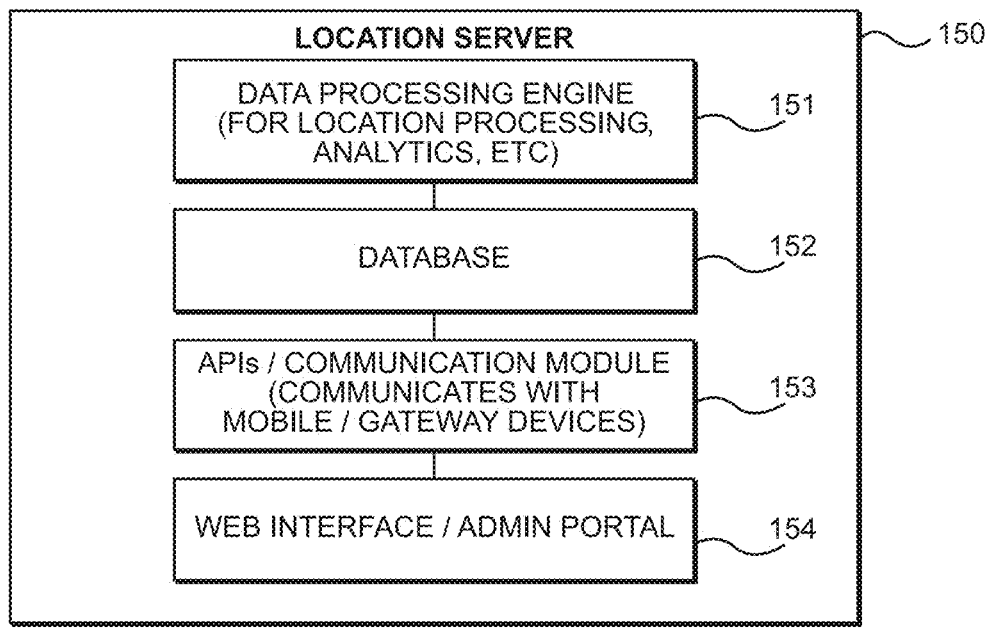
FIG. 2D is a block diagram showing the backend location server of FIG. 1D, with nested sub-blocks illustrating example sub-components, according to one or more embodiments shown or described herein.
Figure 2E:
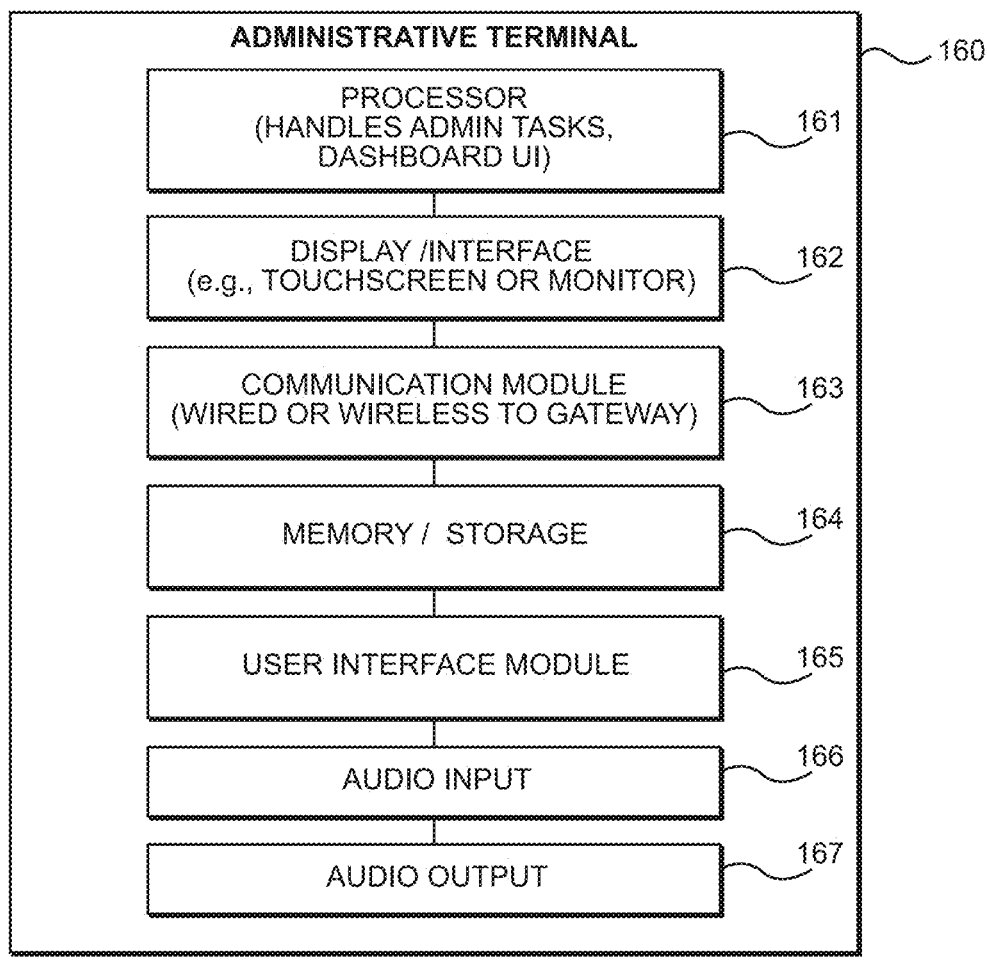
FIG. 2E is a block diagram showing an administrative terminal, such as shown in FIG. 1C, with nested sub-blocks illustrating example sub-components, according to one or more embodiments shown or described herein.

Referring now to FIG. 2E, a block diagram is shown illustrating the internal components of the backend location server 150, which may be located off-site and accessible via a network (140) such as the Internet. The location server 150 includes a data processing engine 151 configured to receive, store, and analyze data collected from other devices. A database 152 is operatively coupled to the data processing engine and is used to store tag records, anchor locations, user data, event logs, and system configurations. The location server 150 includes a communication module 153, which may provide application-programming interfaces (APIs) for secure communication with gateways, mobile devices, administrative terminals, and third-party systems. Optionally, a web interface or administrative portal 154 may be provided for remote system management and data visualization.

Referring now to FIG. 2D, a block diagram of an administrative terminal 160 is shown, which may be used for system monitoring, configuration, or troubleshooting. The admin terminal 160 includes a processor 161 configured to execute administrative software applications. A user interface module 162, such as a touchscreen or keyboard and display, is provided to enable interaction with an administrator. A communication interface 163 provides wired or wireless connectivity to the gateway 140 and/or backend server (150). The admin terminal 160 includes local memory or storage 164 for logs, settings, or locally cached data. The admin terminal 160 may include an administration software or user interface module 165 for managing system behavior, visualizing data, or issuing commands to anchors and tags. The admin terminal 160 may include an audio input 166 (e.g., microphone) and an audio output 167 (e.g., speaker) to enable audio communication between the administrator and remote persons, via the terminal.

Figure 2F:
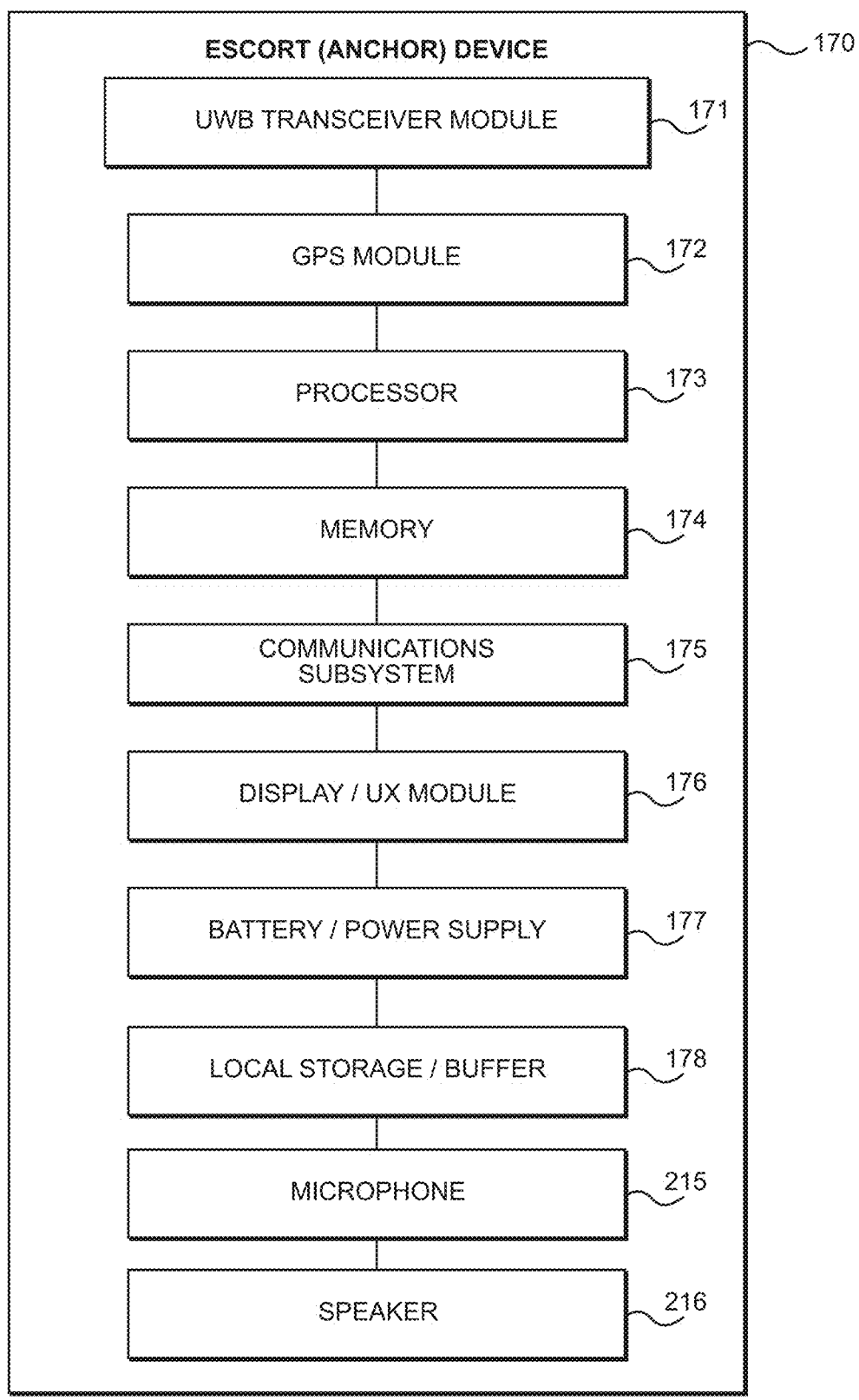
FIG. 2F is a block diagram showing the escort device (i.e., mobile anchor) of FIG. 1E, with nested sub-blocks illustrating example sub-components, according to one or more embodiments shown or described herein.
Figure 2G:
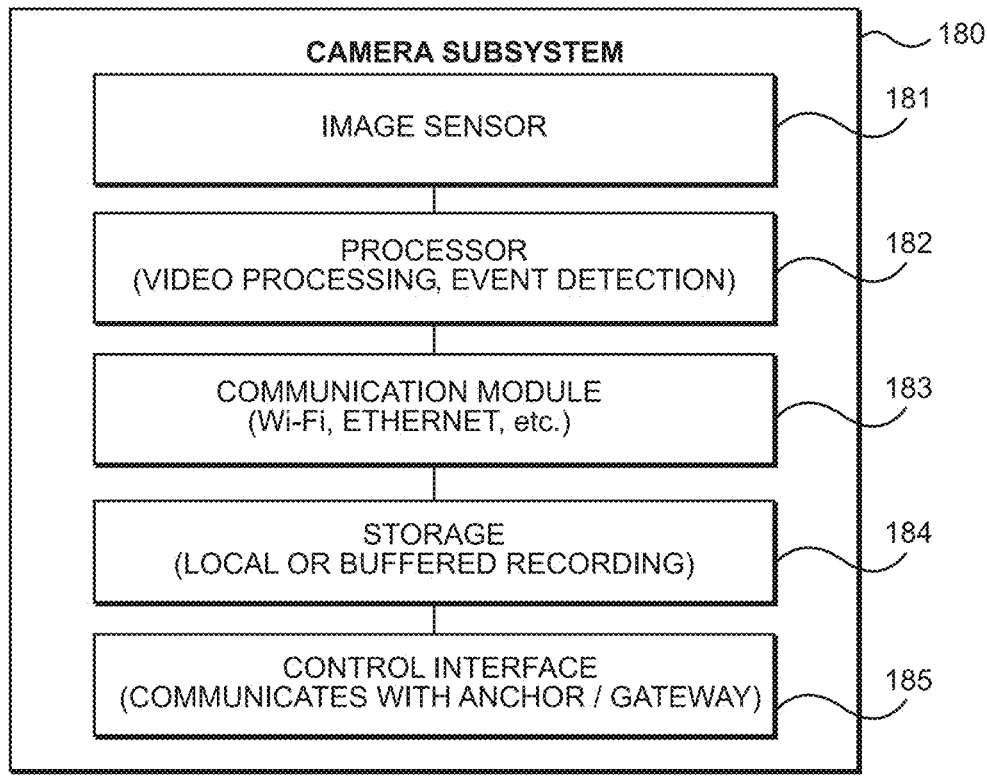
FIG. 2G is a block diagram showing the camera system of FIG. 1F, with nested sub-blocks illustrating example sub-components, according to one or more embodiments shown or described herein.

Referring now to FIG. 2F, a block diagram is presented showing the internal components of a mobile anchor or escort device 170, which may be portable or handheld device. As a non-limiting example, the escort device may be a smartphone running a dedicated mobile application that configures the smartphone's integrated UWB transceiver to function as a mobile UWB anchor within the system (100). Accordingly, the escort device 170 includes a UWB transceiver module 171 for communicating with UWB tags and other anchor devices (e.g., UWB anchor 120). A GNSS/GPS module 172 is provided to determine the absolute location of the escort device 170, which may be used to augment or correct UWB-based location data. A processor 173 controls and coordinates the operation of the escort device 170. Memory 174 is used to store data collected during operation, including position data, tag IDs, and timestamped events. A communications subsystem 175 (e.g., a network interface module) enables long-range communication with a remote backend location server (150), and may include one or more radios supporting cellular, Low Power Wide Area Network (LPWAN), or Wi-Fi protocols. The communications subsystem 175 may be configured for any known short-range communications protocols. The escort device 170 typically includes a user interface module or display 176, such as a touchscreen, for user interaction. A battery or power supply 177 provides energy for operation, and may be rechargeable. Optional components may include one or more sensors, such as accelerometers, gyroscopes, or barometers, for enhancing motion or environmental awareness. A local storage module or buffer 178 may store operational data for batch upload when connectivity is limited. An audio input 166 (e.g., microphone) and an audio output 167 (e.g., speaker) are typically provided, to enable audio communication between the escort personnel and the person to whom the wearable device (110) is secured.

Referring now to FIG. 2F, a block diagram of a camera subsystem 180 is shown, which may be fixed or mobile and configured to interface with one or more UWB anchors (120, 170) and/or the gateway (130) via a control interface 185. In further detail, the control interface 185 enables the camera to receive trigger signals or control commands from the UWB anchor (120) or gateway (130), facilitating event-synchronized recording. The camera subsystem includes an image sensor 181, such as a CMOS or CCD sensor, for capturing visual data. A processor 182 is configured to process image or video data, and may support features such as event-based recording or real-time video streaming. A communication module 183, including wired (e.g., Ethernet) or wireless (e.g., Wi-Fi) interfaces, allows the camera to transmit data to the gateway (130) or directly to the backend location server (150) via the network (140). A storage module 184 may be provided for local recording or buffering of video streams.

Figure 2H:
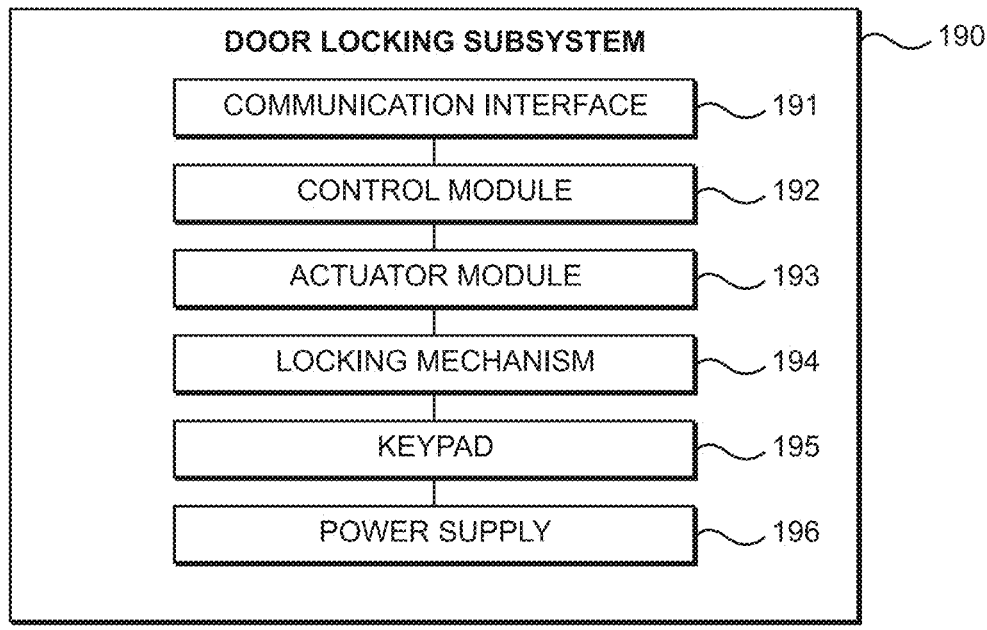
FIG. 2H is a block diagram showing the door locking mechanism, such as shown in FIG. 1B, with nested sub-blocks illustrating example sub-components, according to one or more embodiments shown or described herein.

Referring now to FIG. 2H, a block diagram of a door locking subsystem 190 is shown, which includes a communication interface/module 191, the control module 192, an actuator module 193, a locking mechanism 194, a keypad 195, and a power supply 196. The camera subsystem 190 is configured to receive wired or wireless signals from the UWB anchors (120) and/or the gateway (130). In one embodiment, the camera subsystem 190 is integrated with a UWB anchor (120), sharing the control module 192. The control module 192 interprets receive signals to actuate the locking mechanism 194 accordingly, thereby enabling remote or automated door access control. Further details of the door locking subsystem are provided below in connection with FIGS. 9A and 9B.

Figure 3:
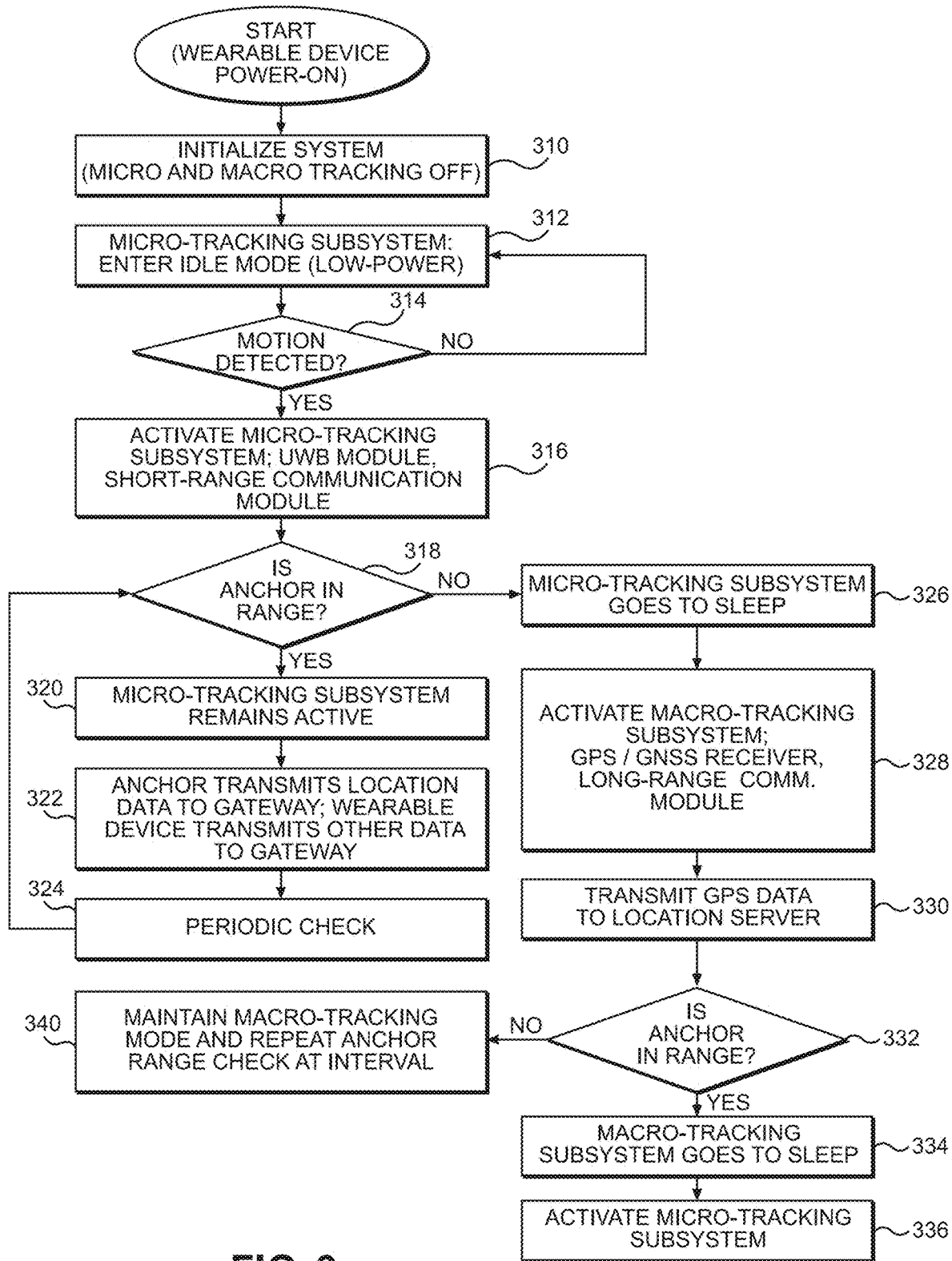
FIG. 3 is a flowchart illustrating an example method implemented by a system using the wearable device of FIGS. 1A and 2A, including a micro-tracking system and a macro-tracking system, according to one or more embodiments shown or described herein.

Referring now to FIG. 3, a flowchart is shown illustrating a representative example method that may be implemented with the wearable device 110 having a micro-tracking subsystem (113, 114) and a macro-tracking subsystem (115, 116), in accordance with one or more embodiments. The method allows the device to dynamically switch between micro- and macro-tracking modes based on the presence or absence of a UWB anchor (120), and uses low-power logic for efficient energy management.

As previously described, the micro-tracking subsystem includes the micro-tracking module 113 and the short-range communication module 114, and the macro-tracking subsystem includes the macro-tracking module 115 and the long-range communication module 116. For brevity and convenience, references to the micro-tracking subsystem in this section will adopt the reference numeral 113, corresponding to its micro-tracking module component (113). Similarly, references to the macro-tracking subsystem in this section will adopt the reference numeral 115, corresponding to its macro-tracking module component (115).

The method begins at a start step, wherein the wearable device (110) is powered on. At step 310, the device (110) initializes internal components, including the micro-tracking subsystem 113 (referring collectively to the micro-tracking module 113 and the short-range communication module 114), the macro-tracking subsystem 115 (referring collectively to macro-tracking module 115 and the long-range communication module 116), motion sensor(s), and other hardware/software subsystems. At this stage, both the micro-tracking subsystem 113 and the macro-tracking subsystem 115 are inactive.

At step 312, the micro-tracking subsystem 113 enters an idle or low-power mode. The wearable device (110) then evaluates, at decision block 314, whether the motion sensor has detected motion that exceeds a predefined activity threshold (e.g., it detects that the user movements are of a speed and nature to suggest that the user is no longer asleep or stationary). If no qualifying movement is detected (e.g., a user rolling over in bed), the system remains in the idle mode (i.e., loops back to step 312). If the motion sensor has detected movement above the threshold (e.g., walking or standing), the method proceeds to step 316, where the micro-tracking subsystem 113 is activated.

At decision block 318, the wearable device (110) determines whether it is within a predetermined range of a UWB anchor device (120, 170). If the UWB anchor (120, 170) is in range, the method continues to step 320, in which the macro-tracking subsystem 115 remains inactive or in sleep mode. At step 322, the UWB anchor (120, 170) transmits UWB signal or location data received from the micro-tracking subsystem (113) to a local gateway device 130 (which is then transmitted to the location server 150 via network 140). After transmission (and as part of periodic step 324), control returns to decision block 318, where the range is continuously or periodically re-evaluated.

If, at decision block 318, the UWB anchor (120, 170) is not detected (i.e., the wearable device 110 is determined to be out of range), the method proceeds to step 326, where the micro-tracking subsystem (113) is deactivated or placed in a sleep state. At step 328, the macro-tracking subsystem (115) is activated. In step 330, the GPS or GNSS receiver (115) is woken to acquire long-range satellite positioning data from satellite positioning system (105). The long-range communication module 122 is activated and, at step 330, transmits the positioning data to the backend location server (150) over a network (140), which may include cellular, LoRaWAN, or satellite protocols. The the wearable device (110) waits for a predetermined time interval before rechecking proximity to the UWB anchor (120, 170).

At decision block 332, the device checks again whether the UWB anchor (120, 170) is now in range. If not, then at step 340, the macro-tracking subsystem (115) remains active and the method loops back to step 332 and continues periodic range checking. If, however, the UWB anchor (120, 170) is detected (i.e., the wearable device 110 has returned within the predetermined range), the method proceeds to step 334, where the macro-tracking subsystem (115) is deactivated or returned to a sleep state. Then at step 336, the micro-tracking subsystem (113) is reactivated, thereby resuming micro-tracking mode. (The sequence of steps 334 and 336 may also be reversed or changed, where the micro-tracking subsystem (113) is reactivated prior to (or concurrent with) the deactivation/sleep of the macro-tracking subsystem (115).

This cycle may continue repeatedly, allowing the wearable device (110) to intelligently toggle between micro-tracking and macro-tracking operations based on user movement and proximity to the UWB anchors (120, 170), while conserving power and maintaining reliable location awareness.

Figure 13:
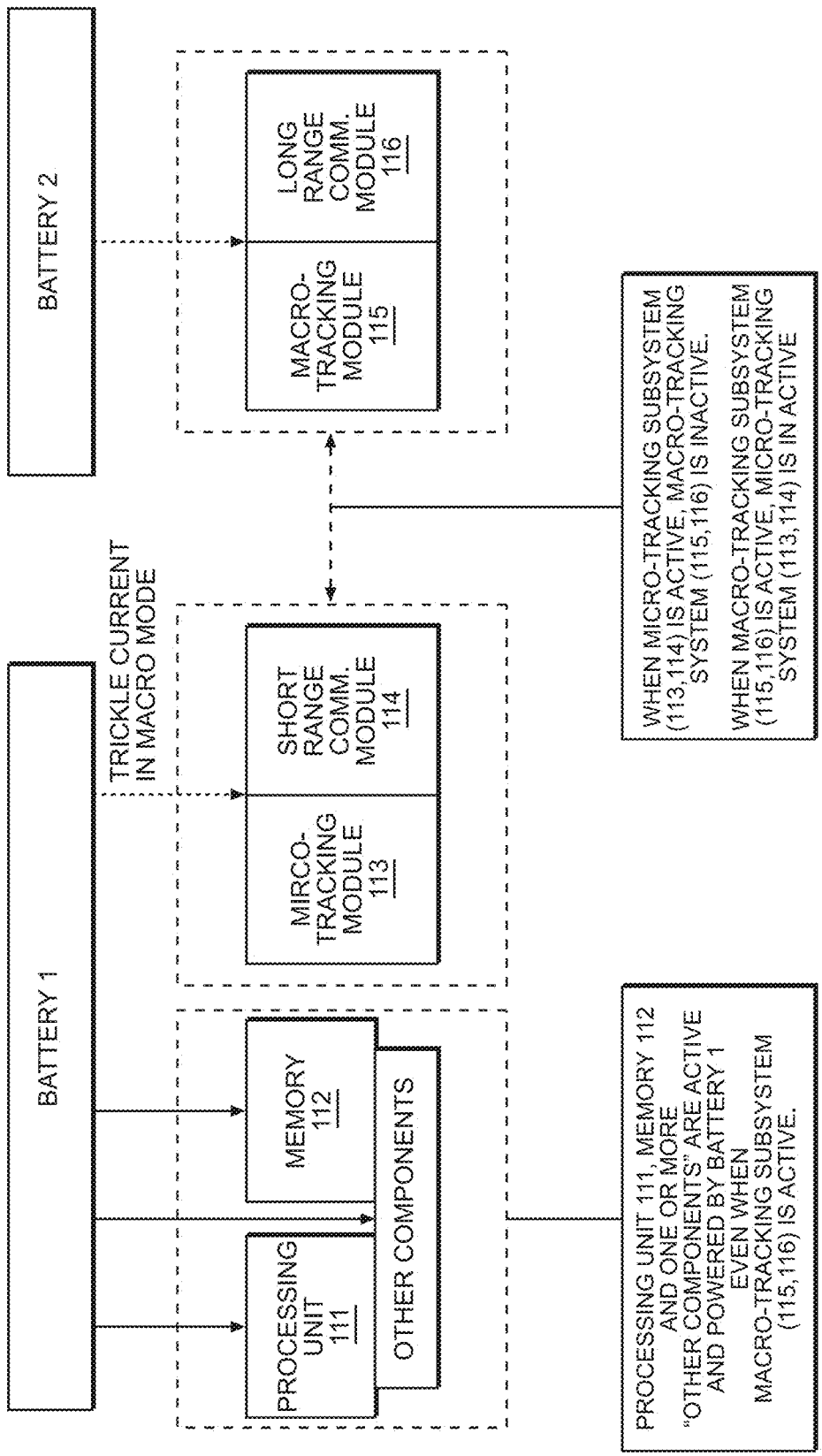
FIG. 13 is a block diagram illustrating the power distribution within the wearable device of FIG. 2A, showing how two separate batteries supply power to distinct functional groups, according to one or more embodiments shown or described herein . . .

In one or more embodiments (such as depicted in FIG. 13 and described below in further detail), the wearable device (110) may include a dual-battery power architecture to further optimize energy management and ensure operational continuity. With reference to FIG. 2A and FIG. 13, the wearable device 110 may comprise a first battery 117*a* (FIG. 2A) or "Battery 1" (FIG. 13) configured to power the standard or primary operational components of the device, including the micro-tracking module 113, short-range communication module 114, and motion sensors (e.g., included with additional sensors 210). In parallel, a second battery 117*b* (FIG. 2A) or "Battery 2" (FIG. 13) may be dedicated solely to powering the macro-tracking subsystem, including the macro-tracking module 115 (e.g., GPS/GNSS receiver) and the long-range communication module 116. During normal operation, when the wearable device 110 is within range of the UWB anchor (120, 170), the system primarily relies on the first battery 117*a* to power the micro-tracking subsystem and associated communication with a local gateway device 130. The second battery 117*b* remains idle or in a low-discharge state during this period. When the device transitions to macro-tracking mode—e.g., upon determining that the UWB anchor (120, 170) is out of range (per decision block 318)—the second battery 117*b* is activated to supply power to the GPS/GNSS receiver of the macro-tracking module 115 and 124 and to the long-range communication module 116, beginning at step 328.

This dual-battery configuration provides several advantages. First, it ensures that the higher-energy-demanding macro-tracking functions do not deplete the main battery 117*a* used for continuous short-range monitoring and baseline device operation. Second, the separation of power sources allows macro-tracking functionality to remain available even if the first battery 117*a* becomes fully discharged. In such cases, emergency tracking may still be achieved through the macro-tracking system powered by the second battery 117*b*, allowing the device to transmit its location to backend location server 150. This architecture is particularly beneficial in safety-critical or long-term tracking scenarios (e.g., asset recovery, personal safety monitoring), where uninterrupted location reporting is essential.

In one or more embodiments, the second battery 117*b* may be a rechargeable or backup battery that is automatically charged by an external source when the system is docked or otherwise not in use. Additionally, battery management circuitry may coordinate power distribution, switching, and charge cycling between the two battery modules as needed to maintain optimal system readiness and longevity. Thus, either battery may be used to temporarily charge the other in the event that one of the batteries charge falls below operational levels.

Figure 4:
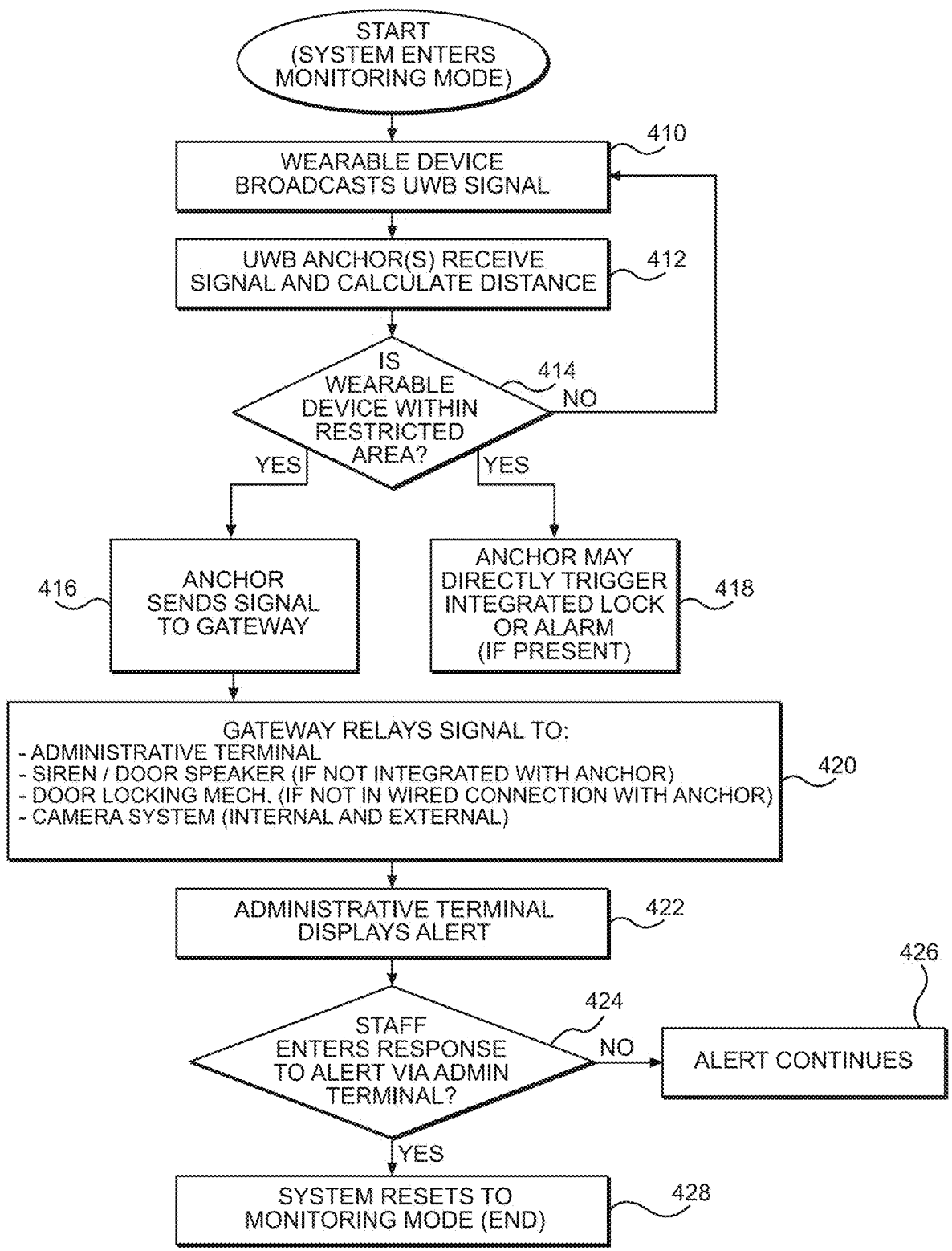
FIG. 4 is a flowchart illustrating an example method implemented by a system using the wearable device of FIGS. 1A and 2A for detecting and responding to an elopement risk, according to one or more embodiments shown or described herein.

Referring now to FIG. 4, a flowchart is shown illustrating an example method for monitoring the location of a wearable device and responding to entry into a restricted area, in accordance with one or more embodiments. The process begins when the system enters monitoring mode. At step 410, the wearable device (110) broadcasts a UWB signal. At step 412, one or more UWB anchors (120) receive the signal and calculate the distance to the wearable device. This distance calculation may be performed locally by the UWB anchor(s) (120) or remotely by the backend location server (150).

At decision step 414, the system determines whether the wearable device (110) is located within a restricted area. If the wearable device (110) is not within a restricted area, the process returns to step 410, and the system continues monitoring. If the wearable device (110) is determined to be within a restricted area, the method proceeds to step 416, where the UWB anchor (120) sends a signal to the gateway (130). In parallel, at step 418, the UWB anchor (120) may directly trigger an integrated lock or alarm, if such subsystems are present and under the control of the UWB anchor (120). If the UWB anchor (120) is not configured to control the lock, alarm, or related subsystems, then at step 420, the gateway (130) relays the signal/command to one or more other components or subsystems. These may include the administrative terminal (160), a siren or door speaker subsystem, a door locking subsystem (190), and/or a camera subsystem (180) (which may include one or more internal and/or external cameras).

At step 422, the administrative terminal (160) receives the alert and displays it to a staff member via a user interface. At decision step 424, the system determines whether a staff member enters a response to the alert via the administrative terminal (160). If no response is entered, the alert continues as shown at step 426. If a response is entered, the system resets to monitoring mode at step 428, concluding the process.

Figure 5:
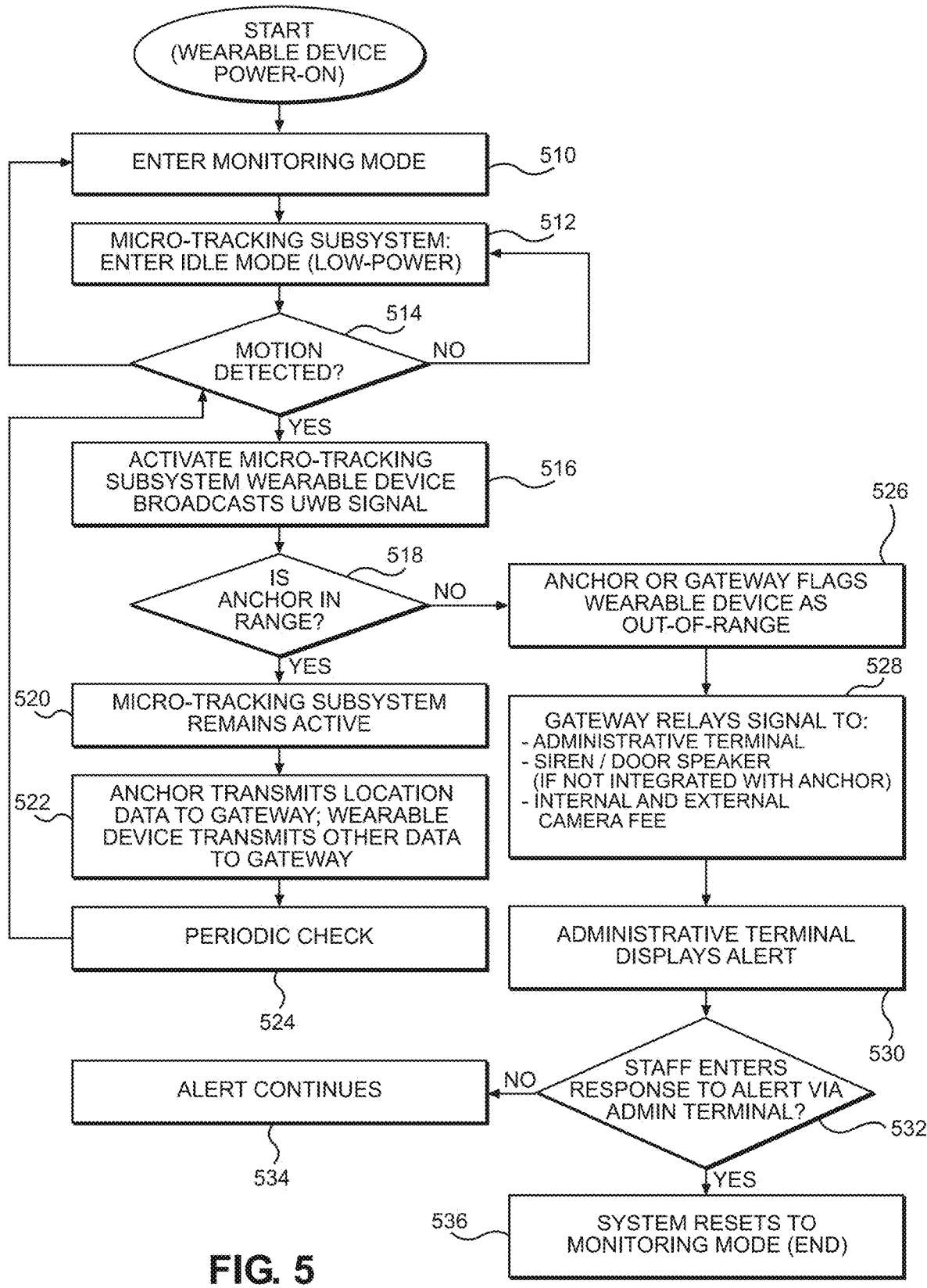
FIG. 5 is a flowchart illustrating an example method implemented by a system using the wearable device of FIGS. 1A and 2A, including a micro-tracking system, according to one or more embodiments shown or described herein.

Referring now to FIG. 5, a flowchart is shown illustrating an example method initiated by powering on a wearable device (110) and transitioning into a micro-tracking and monitoring routine, in accordance with one or more embodiments. The process begins when the wearable device (110) is powered on. At step 510, the wearable device (110) enters a monitoring mode. At step 512, the micro-tracking subsystem (113) enters an idle or low-power mode to conserve energy. At decision step 514, the wearable device (110) determines whether an integrated motion sensor detects motion, as described previously. If no motion is detected, the process returns to step 512, and the micro-tracking subsystem (113) remains in idle mode. If motion is detected, then at step 516, the wearable device (110) activates the micro-tracking subsystem (113) and begins broadcasting a UWB signal.

At decision step 518, the wearable device (110) determines whether a UWB anchor (120, 170) is within range or a predefined distance threshold. If the UWB anchor (120, 170) is within range, then at step 520, the micro-tracking subsystem (113) remains active. At step 522, the UWB anchor (120, 170) transmits UWB signal data or location data to the gateway (130) for forwarding of said signal or location data to the backend location server (150). Optionally, the wearable device (110) may also transmit additional data (e.g., device status, sensor readings, or other non-location data) to the gateway (130). The process then continues with a periodic check, at step 524, and returning to step 514 to again evaluate motion.

If at decision step 518 it is determined that the UWB anchor (120, 170) is not within range, then at step 526, the anchor (120, 170) and/or gateway (130) flags the wearable device (110) as out-of-range. At step 528, the gateway (130) relays a signal, message, or command to one or more of the following: the administrative terminal (160), a siren/alarm subsystem or door speaker (if not otherwise handled by the anchor), and/or a camera subsystem (180), which may include one or more internal and/or external cameras.

At step 530, the administrative terminal (160) receives the alert and displays it to a staff member via a user interface. At decision step 532, the system determines whether a staff member enters a response to the alert via the administrative terminal (160). If no response is entered, the alert continues, as shown at step 534. If a response is entered, then at step 536, the system resets to monitoring mode, concluding the process.

Figure 6A:
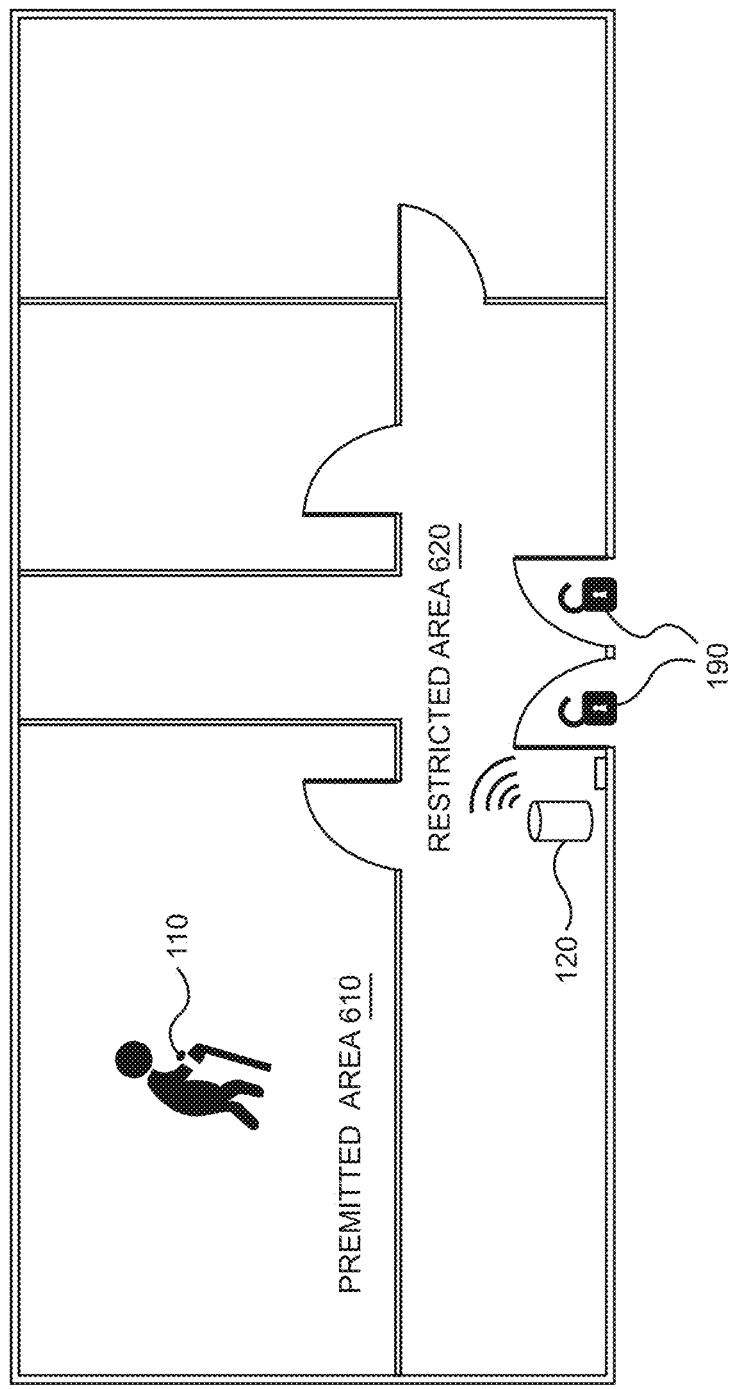

Referring now to FIGS. 6A and 6B, schematic layout diagrams illustrate a resident within a care facility, including representations of room boundaries and the resident wearing a wearable device 110. FIG. 6A shows the resident located within a permitted area 610, such as their room, where no location monitoring is performed. FIG. 6B shows the resident approaching a restricted area 620, such as a hallway near an exit door. One or more UWB anchors (120) are positioned proximate to the exit and define a detection zone. If the wearable device 110 enters this zone, the UWB anchor 120 detects it and triggers a preventive response—either directly or through a gateway (130) as previously described—such as activating the door locking subsystem 190 to prevent potential elopement.

Figure 7A:
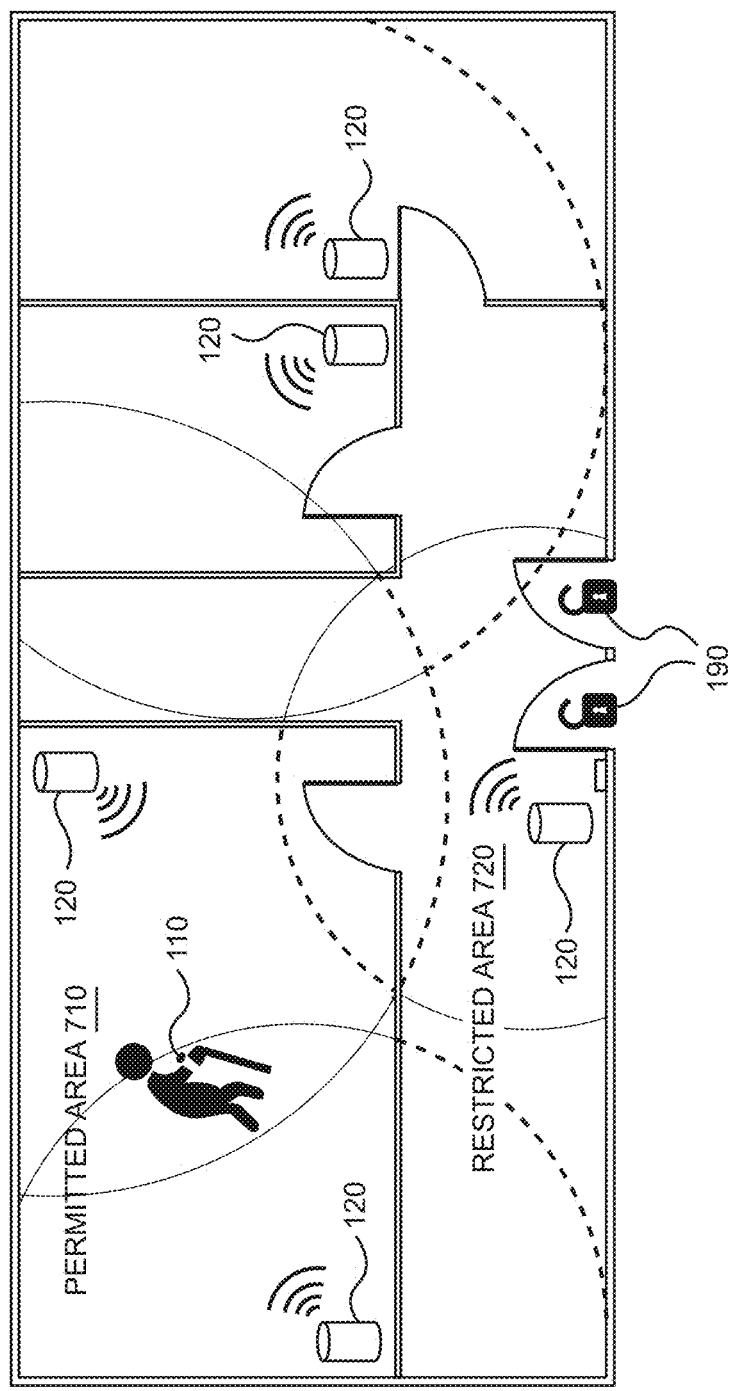
FIGS. 7A and 7B are diagrammatic views illustrating a monitoring and micro-tracking aspect of the system in operation in a residence or facility, according to one or more embodiments shown or described herein.
Figure 7B:
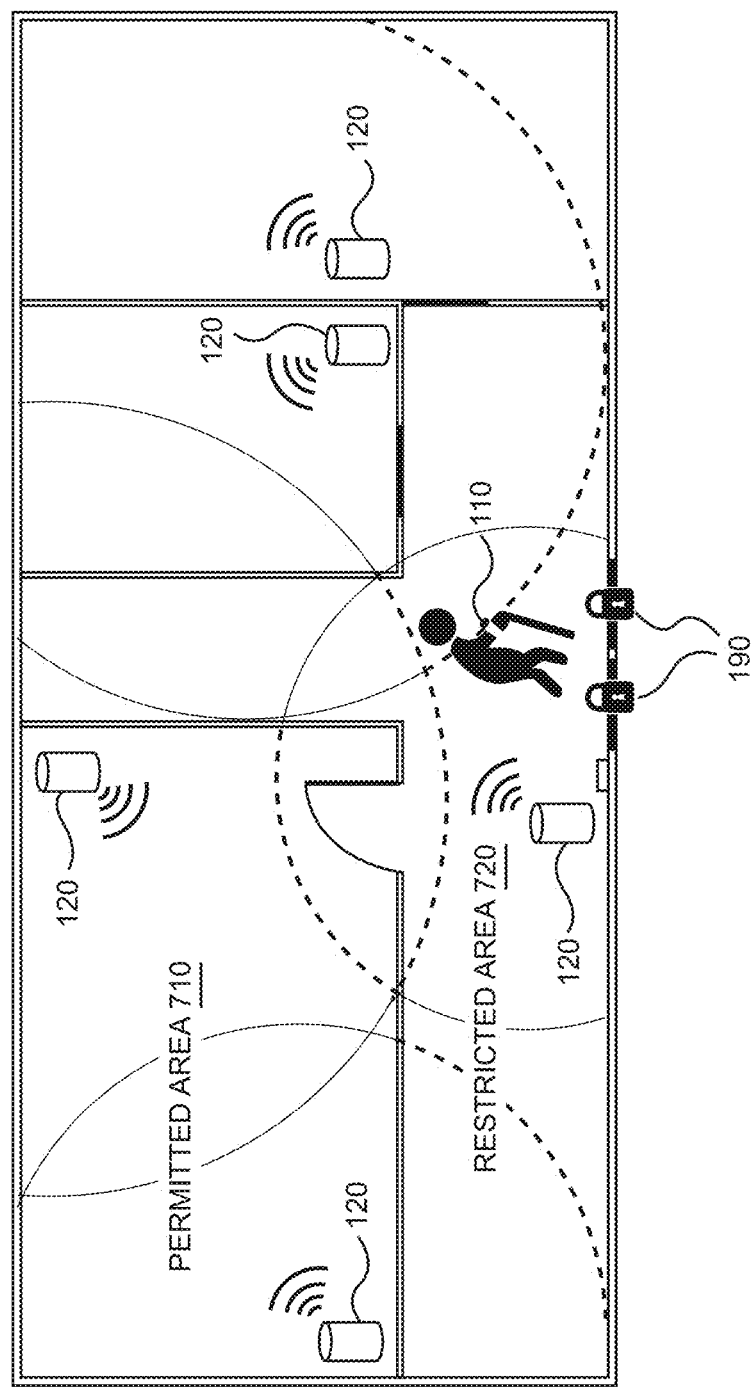

Referring now to FIGS. 7A and 7B, schematic diagrams illustrate a care facility layout showing a resident wearing a wearable device 110 and moving through defined areas. A network of UWB anchors 120 is strategically positioned throughout the facility to provide extensive coverage and enable micro-tracking of the resident's location in real time. In FIG. 7A, the resident remains within a permitted area 710, such as their room, where their position is continuously monitored based on proximity to nearby UWB anchors 120. In FIG. 7B, the resident has walked into a restricted area 720, such as a hallway near an exit door. Upon detecting the wearable device 110 within a predetermined range, a nearby UWB anchor 120—either directly or via wired/wireless communication with another anchor 120 or the gateway 130—issues a command to a door locking subsystem 190 to secure the exit and prevent a potential elopement.

Figure 8A:
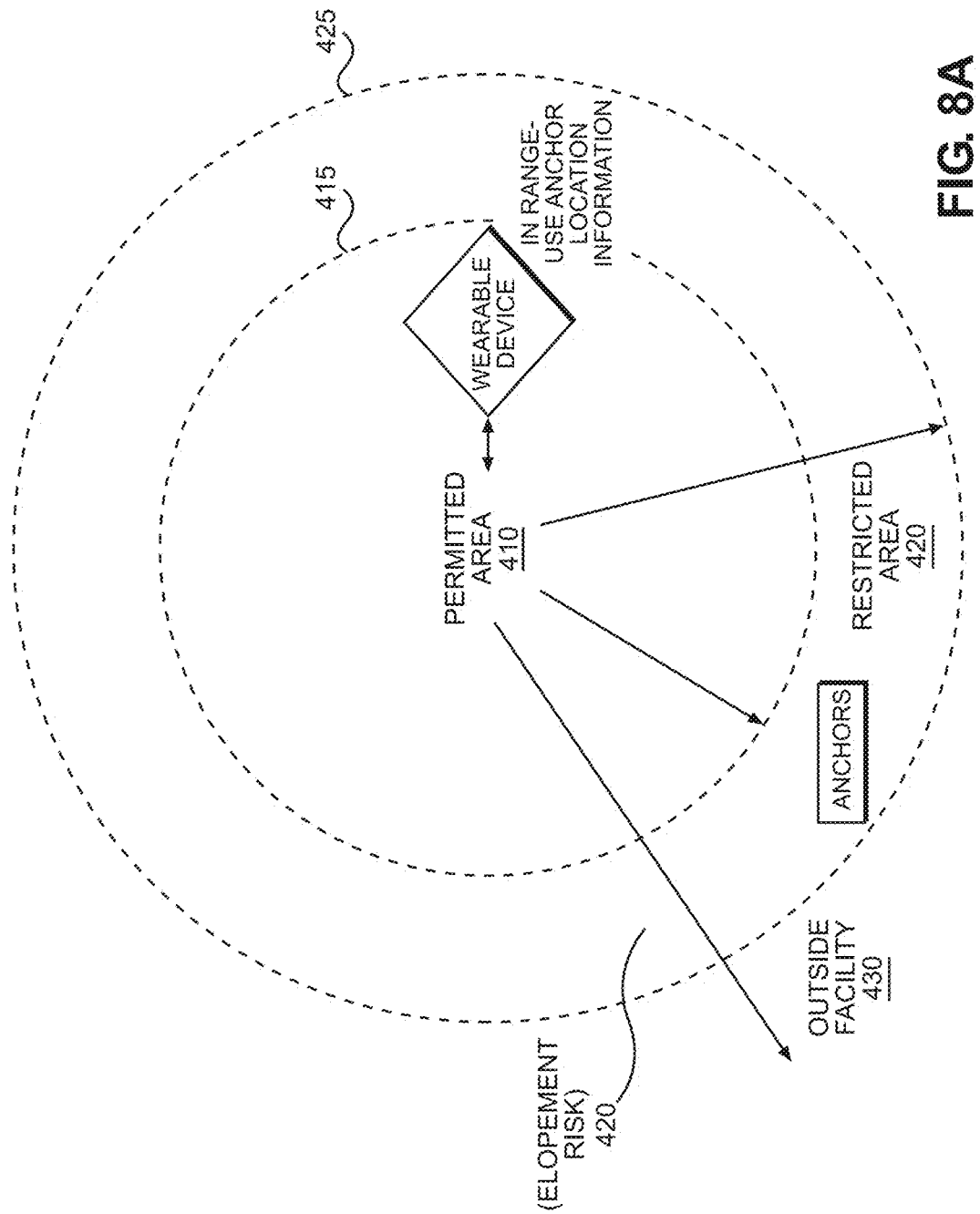
FIG. 8A is a schematic diagram illustrating an example zonal monitoring layout used in an elopement prevention system, according to one or more embodiments shown or described herein.

Referring now to FIG. 8A, an elopement prevention system is shown, in accordance with one or more embodiments. The system includes a set of concentric zones defined by two circular boundaries: an inner boundary 815 and an outer boundary 825, which together define three distinct regions. The innermost region 810 (i.e., within inner boundary 815) corresponds to a "permitted zone," where the resident (or "monitored individual") is authorized to move freely. Surrounding the permitted zone and bounded by inner boundary 815 and outer boundary 825 is an intermediate restricted zone 820, considered an elopement risk area. Beyond the outer boundary 820 is an out-of-bounds zone 830, corresponding to actual elopement or exit from the facility.

A wearable tracking device (110) is secured to the monitored individual and is shown within the permitted area 810. As would be understood from the previous descriptions, when the wearable device (110) is located within the permitted area or zone 810 or the intermediate/restricted area or zone 820, the system engages the micro-tracking subsystem. The micro-tracking system operates in a low-power mode as compared to the macro-tracking subsystem. The wearable device (110) may switch to the more power intensive macro-tracking mode when the resident exits the facility to the outside 830.

In one or more embodiments, tracking mode transitions are automatically triggered based on the location of the wearable device (110) relative to the boundaries 815 and 825. These transitions may also take into account individual-specific risk profiles, behavioral data, or real-time environmental factors to dynamically assess the level of elopement risk. Such risk profiles can be aided by utilizing the machine-learning (ML) predictor (211) previously described in connection with FIG. 2A.

Referring now to FIG. 8B, an embodiment of the elopement prevention system 100 is shown with an enhanced UWB anchor (120) deployment strategy to support precise micro-tracking within the permitted area/zone 810 and restricted area/zone 820. A plurality of UWB anchors are distributed throughout the inner and intermediate areas/zones (810, 820). The UWB anchors (120) are arranged such that their respective signal coverage areas overlap, forming a mesh or high-resolution tracking field that enables accurate, real-time positioning of the wearable tracking device (110) when it is within area/zones 810 or 820.

The overlapping coverage provided by beacons 172a-172n enhances location granularity, supporting functionality such as location-based alerts, risk scoring, or adaptive behavior-based tracking thresholds. This micro-tracking capability may include technologies such as, but not limited to, Bluetooth Low Energy (BLE), infrared, or proprietary RF protocols.

As shown, micro-tracking remains active only within the permitted and restricted zones, i.e., inside the outer boundary 825. When the wearable tracking device (110) crosses the outer boundary 825 and enters outside of the facility 830, the system activates the macro-tracking subsystem (115) using satellite-based systems such as GPS or GNSS to determine the individual's location outside the facility's perimeter.

Figure 9A:
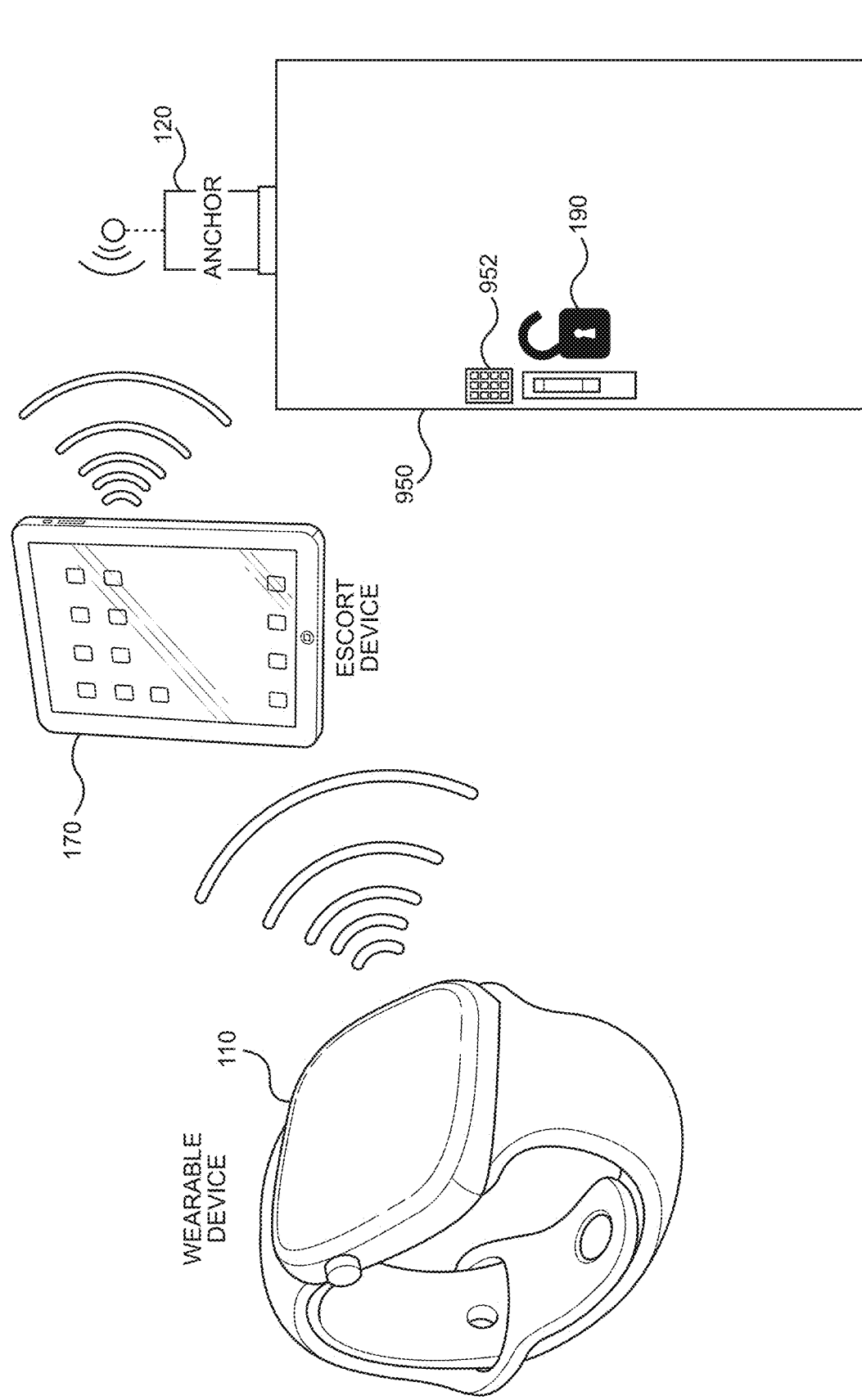
FIG. 9A illustrates, using representative icons, an access control system interacting with the wearable device of FIG. 2A and the escort UWB anchor of FIG. 2F, according to one or more embodiments shown or described herein.

Referring now to FIG. 9A, representative icons depict a door locking subsystem 190 interacting with the wearable device 110 of FIG. 2A and the escort UWB anchor 170 of FIG. 2F, in accordance with one or more embodiments. As previously described, the wearable tracking device 110 is provided with an integrated ultra-wideband (UWB) module/transceiver that broadcasts UWB signals. The wearable device 110 is typically assigned and secured to a resident in a secure facility (e.g., nursing home resident). A UWB anchor device 120 is associated with a doorway 950 and configured to detect the proximity of UWB signals emitted by the wearable device 110. Upon detecting the presence of the wearable device 110 near the door 950, the UWB anchor 120 evaluates whether the user wearing the device is authorized to be in proximity to that doorway 950. If the user is designated as an elopement risk, the UWB anchor 120 communicates with the door locking subsystem 190 to ensure the door 950 remains or becomes locked, thereby preventing the user from exiting through the door 950.

However, in the event that an authorized escort, such as a facility staff member, accompanies the user the system behavior changes. The escort carries a portable escort anchor device 170—implemented, for example, via a smartphone or tablet equipped with UWB capabilities—which engages in ranging or pairing operations with the wearable device 110. The UWB anchor 120 associated with the door 950 recognizes the presence of both the wearable device 110 and the escort anchor device 170 and determines that an authorized escort relationship exists. As a result, the door locking subsystem 190 will not be activated, and the door 950 remains unlocked to permit egress. Alternatively, if the door 950 is already in a locked state, the presence of the escort anchor device 170 enables the accompanying staff member to override the lock by entering a passcode or PIN into a keypad 952 on or near the door 950. Without the verified presence of the escort anchor device 170, such access would not be permitted in order to prevent unauthorized exit by the user.

Figure 9B:
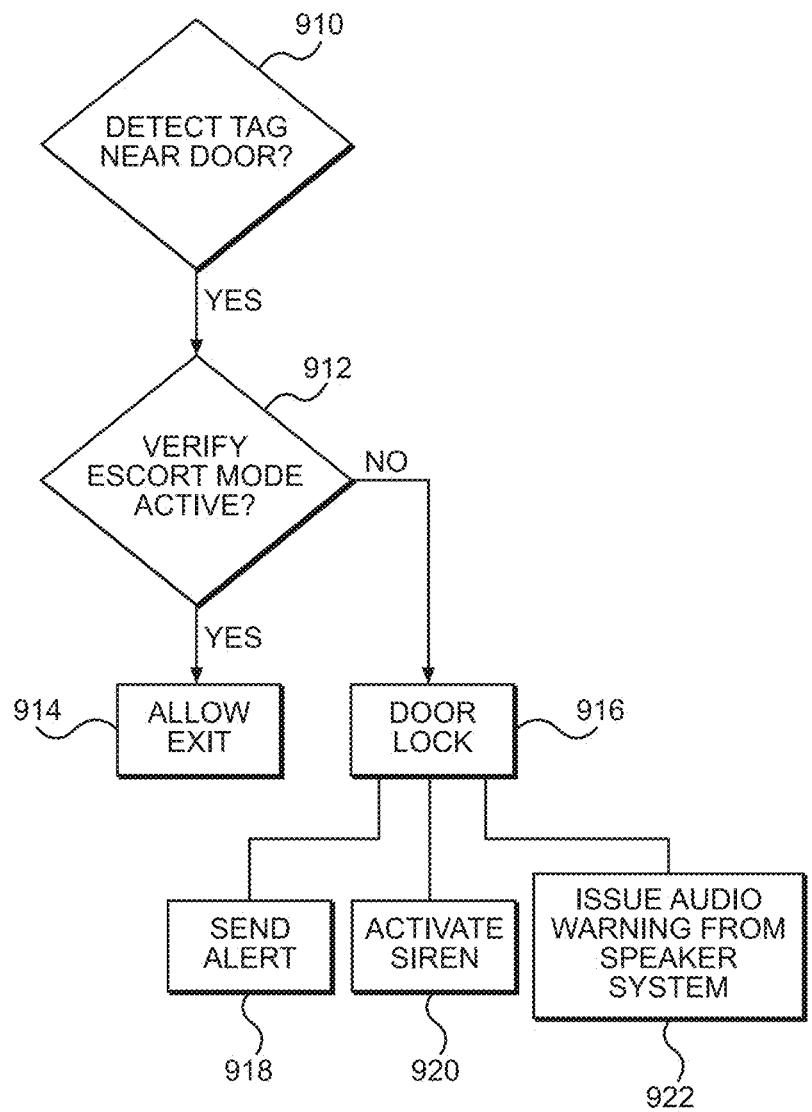
FIG. 9B is a flowchart illustrating an access control decision process, according to one or more embodiments shown or described herein.

Referring now to FIG. 9B, a flowchart is shown illustrating an example method implemented with the system configuration previously described in connection with FIG. 9A. The process begins at decision step 910, where a UWB anchor (120) of the system detects a UWB tag (e.g., wearable device 110) near the door. Next, at decision step 912, the system determines whether escort mode is currently active—i.e., whether the wearable device (110) is within a predetermined range of an escort anchor device (170). Thus "escort mode" is considered active when the UWB anchor (120) associated with the door identifies a valid escort anchor device (170) in proximity that is linked via ranging or pairing to the wearable device (110). If escort mode is active, then at step 914, the system permits exit either by unlocking the door automatically or by enabling the escort staff member to manually enter a keycode into a door-mounted keypad to gain access. If escort mode is not active, the process proceeds to step 916, where the door locking subsystem (190) is activated to lock the door. Following this, any one or more of the following emergency actions may be performed: at step 918, an alert communication is sent to an administrative terminal (160); at step 920, a siren or audible alarm is activated; and at step 922, an audio warning is broadcast via a speaker subsystem located near the door. While the flowchart does not specify a definitive end state, the alert condition may be cleared either through a preprogrammed timeout or by manual intervention at the admin terminal by facility staff, as previously described in connection with other examples.

FIG. 10 illustrates a table identifying various system devices, the communications protocols they use, and their respective roles within the system, according to one or more embodiments shown or described herein. These devices include the previously disclosed wearable device 111, UWB anchors 120, location server 150, escort device 170, and admin terminal 160.

Figure 11:
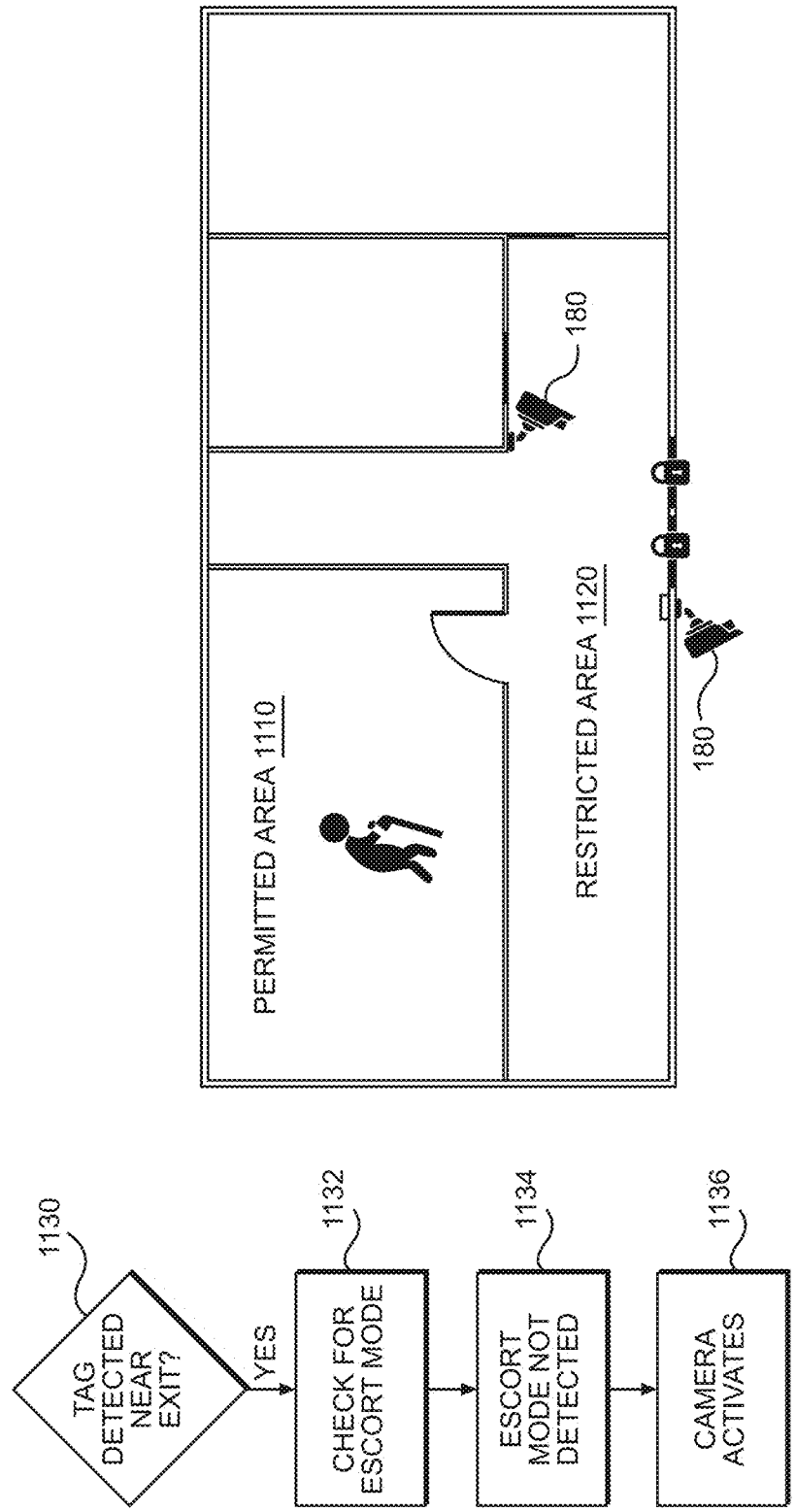
FIG. 11 includes a diagrammatic view illustrating an elopement prevention aspect of the system involving a camera subsystem and a flowchart illustrating a camera activation decision process, according to one or more embodiments shown or described herein.

Referring now to FIG. 11, a schematic diagram illustrates a care facility layout showing a resident wearing a wearable device 110, followed by a flowchart illustrating the system's automated response, in accordance with one or more embodiments. The schematic diagram depicts the resident in a permitted area 1110, while avoiding the adjacent hallway, which is identified as restricted area 1120. If the resident were to enter the restricted area 1120, one or more UWB anchors positioned in or near the restricted area (not shown) will detect the resident's wearable device 110 and send an instruction to he camera subsystem (180) to activate nearby cameras.

The flowchart is shown illustrating an example method implemented with the system configuration similar to that described in connection with FIG. 9B. The process begins at decision step 1130, whether a UWB anchor (120) of the system detects a UWB tag (e.g., wearable device 110) near the door. If yes, then at step 1132, the system checks whether escort mode is currently active, as previously described. If escort mode is not active, as determined at step 1134, then the process proceeds to step 1136, where the camera subsystem (180) activates one or more cameras in the vicinity.

Figure 12:
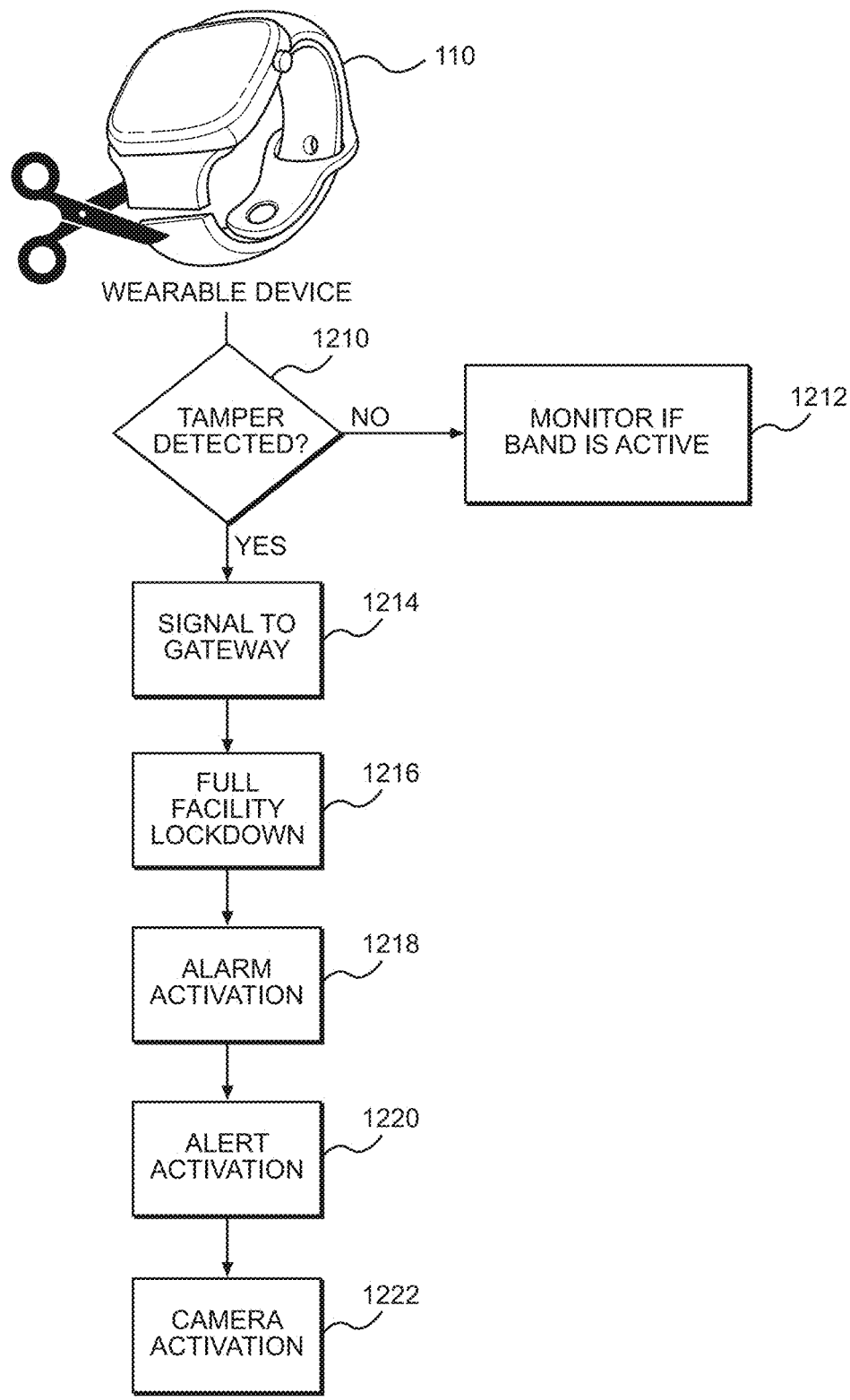
FIG. 12 is a diagram including an icon of the wearable device of FIG. 2A undergoing a tampering event and a flowchart illustrating the system response process, according to one or more embodiments shown or described herein.

Referring now to FIG. 12, a diagram is shown comprising an iconic representation of a tamper event affecting the wearable device 110—such as a broken band, damaged housing, or severed connection—followed by a flowchart illustrating the system's automated response, in accordance with one or more embodiments. The system first determines, at decision step 1210, whether tampering has occurred based on sensor inputs from the wearable device, such as band continuity, pressure, or electrical state. If no tamper is detected, the system proceeds to step 1212, where it continues monitoring the operational status of the wearable device 110, including its tracking and communication functions. If at step 1220 a tamper is detected, the system advances to step 1214 where a tamper signal is transmitted to a gateway (130) and/or location server (150). The system then executes a series of predefined security responses: at step 1216, it initiates a full or partial facility lockdown, commanding door locking subsystem (190), such as anchor-controlled doors, to lock. At step 1218, it activates the alarm subsystem, which may include audible or visual alerts. At step 1220, an automated alert message is sent to one or more designated recipients, such as administrator terminals (160) or caregiver mobile devices. Finally, at step 1222, the system triggers camera activation (of the camera subsystem 180) in the area associated with the tamper event, enabling live video capture or streaming.

Referring now to FIG. 13, in accordance with one or more embodiments, the wearable device (110) includes two separate batteries: a first battery (117a) configured to power the micro-tracking subsystem (113), and a second battery (117b) configured to power the macro-tracking subsystem 9115). When one subsystem is active, the other is placed in a low-power or sleep mode to optimize energy usage. Even when the macro-tracking subsystem (115) is active, the micro-tracking subsystem (113) may still receive a trickle flow of power, allowing it to periodically wake and verify whether the device remains within a predetermined range of one or more UWB anchors. Other components of the device, including but not limited to the processor 111, memory 112, and associated circuitry, are powered by the first battery (117a), both during micro-tracking operation and while the macro-tracking subsystem is active.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

It should be understood that embodiments described herein as being implemented using instructions that are executable by one or more processors may alternatively be implemented using programmatic modules or components. Thus, even if subject matter is claimed as being implemented using instructions that are executable by one or more processors it should be given its broadest reasonable interpretation as also including at least implementation by using programmatic modules or components.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively, or in addition, the program instructions can be encoded on an artificially generated propagated signal, e.g., a machine generated electrical, optical, or electromagnetic signal, which is generated to encode information for transmission to suitable receiver apparatus for execution by a data processing apparatus. A computer storage medium can be, or be included in, a computer readable storage device, a computer readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning system (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described.

While the invention has been described in its preferred forms or embodiments with some degree of particularity, it is understood that this description has been given only by way of example and that numerous changes may be made without departing from the spirit and scope of the invention.

The invention claimed is:

1. A wearable device for monitoring and tracking a person, comprising:
    a micro-tracking module comprising an ultra-wideband (UWB) transceiver configured to exchange UWB signals with a UWB anchor when the wearable device is within UWB communication range thereof, wherein the signals transmitted by the micro-tracking module are usable to determine micro-location data of the wearable device, and wherein the signals transmitted by the UWB anchor are usable to determine whether the wearable device is within UWB communication range thereof;
    a macro-tracking module comprising a global navigation satellite system (GNSS) receiver configured to receive GNSS-derived location data;
    a long-range communication module configured to transmit the GNSS-derived location data to a backend location server;
    a first battery configured to supply power to the micro-tracking module; and
    a second battery, separate from the first battery, configured to supply power the macro-tracking module and the long-range communication module; and
    a data processing apparatus configured to:
        (a) determine whether the wearable device is within UWB communication range of the UWB anchor based on receipt or non-receipt by the micro-tracking module of the signals transmitted by the UWB anchor;
        (b) selectively cause the first battery to adjust a power state of the micro-tracking module based on whether the wearable device is within UWB communication range of the at least one UWB anchor; and
        (c) selectively cause the second battery to supply power to the macro-tracking module and the long-range communication module when the wearable device is outside UWB communication range of the UWB anchor.

2. The wearable device of claim 1, wherein the data processing apparatus is further configured to maintain or transition the macro-tracking module and the long-range communication module to an inactive state upon determining that the wearable device is within UWB communication range of the UWB anchor.

3. The wearable device of claim 1, wherein the data processing apparatus is further configured to maintain or transition the macro-tracking module and the long-range communication module to an active state, and maintain or transition the micro-tracking module to a sleep state, upon determining that the wearable device is outside UWB communication range of the UWB anchor.

4. The wearable device of claim 3, wherein the data processing apparatus is further configured to cause the micro-tracking module to periodically awaken to determine whether the wearable device is within UWB communication range of the UWB anchor while the macro-tracking module is active, and if the data processing apparatus determines that the wearable device is within UWB communication range of the UWB anchor, the data processing apparatus maintains the micro-tracking module in an active or idle state and transitions the macro-tracking module and long-range communication module to an inactive state.

5. The wearable device of claim 4, further comprising one or more sensors configured to detect user activity indicative of a motion triggering event, wherein, responsive to the wearable device being within UWB communication range of the UWB anchor and the detection of a motion triggering event, the data processing apparatus is further configured to cause the micro-tracking module to transition to, or remain in, an active state.

6. The wearable device of claim 4, further comprising one or more sensors configured to detect user activity indicative of a motion triggering event, wherein, responsive to the wearable device being within UWB communication range of the UWB anchor and no detection of a motion triggering event, the data processing apparatus is further configured to cause the micro-tracking module to transition to, or remain in, a low-power idle state.

7. The wearable device of claim 1, wherein the data processing apparatus is configured to maintain power delivery from the first battery to the micro-tracking module once the micro-tracking module has been initialized, and to vary a power state of the micro-tracking module between an active mode, a low-power idle mode, and a sleep mode according to operational parameters.

8. The wearable device of claim 1, further comprising a short-range communication module; and
   wherein the data processing apparatus is further configured to:
   (a) selectively cause the first battery to power the short-range communication module when the wearable device is within UWB communication range of the UWB anchor; and
   (b) selectively cause the short-range communication module to transmit operational data other than location data.

9. The wearable device of claim 8, further comprising a tamper detection sensor configured to detect a tampering event, wherein, responsive to detection of a tampering event, the data processing apparatus is configured to generate an alert and cause the short-range communicate module to transmit the alert to one or more designated recipients.

10. A system for monitoring, tracking and managing movement of an individual assigned to an indoor facility, the system comprising:
    an indoor anchor comprising an ultra-wideband (UWB) transceiver;
    a mobile escort anchor comprising a UWB transceiver; and
    a wearable tracking device worn by, and associated with, a particular individual, the wearable tracking device comprising a micro-tracking module, the micro-tracking module comprising a UWB transceiver;
    wherein the indoor anchor is disposed within the indoor facility and configured to:
    (a) communicate with other UWB anchors and other UWB-enabled devices using UWB signals, and optionally one or more other wireless communication protocols;
    (b) receive UWB signals transmitted by the wearable tracking device;
    (c) determine a location or proximity status of the wearable tracking devoice based on received signal strength, time-of-flight measurements, or both; and
    (d) transmit at least one of the location or proximity status data to a backend location server or a connected subsystem;
    wherein the escort anchor is adapted for indoor and outdoor use and is configured to:
    (a) communicate with the one or more indoor anchors and other UWB-enabled devices using UWB signals, and optionally one or more other wireless communication protocols;
    (b) receive UWB signals transmitted by the wearable tracking device;
    (c) determine a location or proximity status of the wearable tracking device based on received signal strength, time-of-flight measurements, or both; and
    (d) transmit at least one of the location or proximity status data to the backend location server or a connected subsystem;
    wherein the wearable tracking device is configured to exchange UWB signals with the indoor anchor within UWB communication range thereof;
    wherein the wearable tracking device is configured to exchange UWB signals with the escort anchor within UWB communication range thereof;
    wherein signals transmitted by the micro-tracking module are usable by the indoor anchor, the escort anchor, or both, to determine proximity of the wearable tracking device to the respective anchors;
    wherein signals transmitted by the indoor anchor and the escort anchor are usable by the wearable tracking device to determine whether the wearable device is within UWB communication range of either or both of the indoor anchor and the escort anchor; and
    wherein at least one indoor anchor is disposed near an exit door and operatively associated with a door locking subsystem configured to control locking of the exit door, the at least one indoor anchor being configured to detect the wearable tracking device within its detection range and to operatively trigger locking of the exit door upon such detection, unless the wearable tracking device is accompanied by the escort anchor.

11. The system of claim 10, wherein the at least one indoor anchor disposed near the exit door is further configured, upon detecting the wearable tracking device within its detection range without an accompanying escort anchor, to operatively trigger activation of at least three additional subsystems selected from the group consisting of:
    (a) an alarm subsystem configured to emit an audible alarm;
    (b) a camera subsystem configured to capture visual data;
    (c) an alert messaging subsystem configured to send an electronic notification to one or more designated recipients; and
    (d) a speaker subsystem to play a live, prerecorded, or generated audible message.

12. The system of claim 10, wherein a tamper detection sensor is integrated with the wearable tracking device, and wherein, in response to detection of a tampering event when the wearable tracking device is determined to be located within the indoor facility, the system is configured to trigger activation of at least three subsystems selected from the group consisting of:
    (a) an alarm subsystem configured to emit an audible alarm;
    (b) a camera subsystem configured to capture visual data;
    (c) an alert messaging subsystem configured to send an electronic notification to one or more designated recipients; and
    (d) a speaker subsystem to play a live, prerecorded, or generated audible message; and
    wherein the system is configured to enable two-way audio communication between the wearable tracking device and an administrative terminal, regardless of whether the wearable tracking device is located indoors or outdoors, each of the wearable tracking device and the administrative terminals having respective audio input and output components.

13. The system of claim 10, wherein the wearable tracking device further comprises:
- a macro-tracking module comprising a global navigation satellite system (GNSS) receiver configured to receive GNSS-derived location data;
- a long-range communication module configured to transmit the GNSS-derived location data to the backend location server;
- a first battery configured to supply power to the micro-tracking module;
- a second battery, separate from the first battery, configured to supply power to the macro-tracking module and the long-range communication module; and
- a data processing apparatus configured to:
  - (a) determine whether the wearable device is within UWB communication range of the indoor anchor, the escort anchor, or both, based on receipt or non-receipt by the micro-tracking module of the signals transmitted by the indoor anchor and the escort anchor;
  - (b) selectively cause the first battery to adjust a power state of the micro-tracking module based on whether the wearable tracking device is within UWB communication range of the indoor anchor, the escort anchor, or both; and
  - (c) selectively cause the second battery to supply power to the macro-tracking module and the long-range communication module when the wearable tracking device is outside UWB communication range of both the indoor anchor and the escort anchor; and
- wherein the backend location server is operable to receive the GNSS-derived location data transmitted by the wearable tracking device.

14. The system of claim 13, wherein the escort anchor further comprises:
- a GNSS receiver configured to receive GNSS-derived location data;
- a long-range communication module configured to transmit the GNSS-derived location data from the GNSS receiver to the backend location server when:
  - (a) the wearable tracking device is outside UWB communication range of the indoor anchor; and
  - (b) the wearable tracking device is within UWB communication range of the escort anchor;
- an audio input component; and
- an audio output component;
- wherein the escort anchor is configured to:
  - (a) trigger an alert to the backend location server if the wearable tracking device moves outside of UWB communication range from the escort UWB anchor; and
  - (b) activate a two-way audio communication link between the escort anchor and the wearable tracking device, wherein the two-way audio communication is established either:
    - (i) directly between the respective long-range communicate modules of the wearable tracking device and the escort anchor; or
    - (ii) indirectly via the backend location server, which relays audio data between the wearable tracking device and the escort anchor using their respective long-range communication modules; and
- wherein the backend location server is operable to receive the GNSS-derived location data transmitted by the escort anchor.

15. The system of claim 10, wherein the indoor anchor comprises a plurality of UWB anchors distributed throughout the indoor facility in a manner that enables triangulation or multilateration of the position of the wearable tracking device in real time.

16. A method for monitoring, tracking, and managing movement of an individual assigned to an indoor facility, the individual wearing a wearable tracking device, the method comprising:
- receiving, at an indoor anchor disposed within the indoor facility, UWB signals transmitted by a micro-tracking module included in the wearable tracking device, the indoor anchor comprising a UWB transceiver and being configured to communicate using UWB signals;
- determining, by the indoor anchor, a location or proximity status of the wearable tracking device using received signal strength, time-of-flight measurements, or both;
- transmitting, from the indoor anchor to a backend location server, at least one of the location or proximity status of the wearable tracking device;
- detecting, by the indoor anchor positioned near an exit door of the indoor facility, presence of the wearable tracking device within its UWB detection range;
- determining whether the wearable tracking device is accompanied by an escort anchor based on UWB signal exchange, the escort anchor comprising a UWB transceiver;
- triggering, based on said determining, activation of a door locking subsystem to lock the exit door, unless the wearable tracking device is accompanied by the escort anchor.

17. The method of claim 16, further comprising:
- upon detecting that the wearable tracking device is within its detection range without the accompanying escort anchor, triggering activation of at least three additional subsystems selected from the group consisting of:
  - (a) an alarm subsystem configured to emit an audible alarm;
  - (b) a camera subsystem configured to capture visual data;
  - (c) an alert messaging subsystem configured to send an electronic notification to one or more designated recipients; and
  - (d) a speaker subsystem to play a live, prerecorded, or generated audible message.

18. The method of claim 16, further comprising:
- in response to detecting a tampering event involving the wearable tracking device while it is within the indoor facility, activating at least three of the following subsystems:
  - (a) an alarm subsystem to emit an audible alarm;
  - (b) a camera subsystem to capture visual data;
  - (c) an alert messaging subsystem to send electronic notifications to one or more designated recipients; and
  - (d) a speaker subsystem to play a live, prerecorded, or generated audible message; and
- enabling a two-way audio communication between the wearable tracking device and an administrative terminal, each having respective audio input and output components.

19. The method of claim 16, further comprising:
- determining, by a data processing apparatus included in the wearable tracking device, whether the wearable tracking device is within UWB communication range of the indoor anchor, the escort anchor, or both, based on receipt or non-receipt of signals transmitted by the indoor anchor and the escort anchor;

selectively causing a second battery included in the wearable tracking device, separate from a first battery included in the wearable tracking device, to supply power to a macro-tracking module and a long-range communication module included in the wearable tracking device when the wearable tracking device is outside of UWB communication range of both the indoor anchor and the escort anchor;

receiving global navigation satellite system (GNSS)-derived location data by a (GNSS) receiver included in the macro-tracking module included in the wearable tracking device;

transmitting the GNSS-derived location data from the long-range communication module included in the wearable tracking device to the backend location server; and selectively causing the first battery, configured to supply power to the micro-tracking module of the wearable tracking device, to adjust a power state of the micro-tracking module based on the determination.

20. The method of claim 19, further comprising receiving GNSS-derived location data by a GNSS receiver included in the escort anchor;

determining that:
  (a) the wearable tracking device and the escort anchor are each outside UWB communication range of the indoor anchor; and
  (b) the wearable tracking device is within UWB communication range of the escort UWB anchor;

transmitting the GNSS-derived location data from a long-range communication module included in the escort anchor to the backend location server based on the determination;

detecting, by the escort anchor, that the wearable tracking device has moved outside UWB communication range of the escort anchor;

triggering an alert to the backend location server in response to the detection;

receiving, by an audio input component included in the escort anchor, audio data from a user of the escort anchor;

activating a two-way audio communication link between the escort UWB anchor and the wearable tracking device in response to the detection or the alert; and transmitting and receiving audio data between the escort anchor and the wearable tracking device during the audio communication link, wherein the audio communication link is established either: (i) directly via respective long-range communication modules of the escort anchor and the wearable tracking device, or (ii) indirectly via the backend location server, which relays audio data between the escort UWB anchor and the wearable tracking device using their respective long-range communication modules.

* * * * *